US012359920B2

United States Patent
Yamabayashi et al.

(10) Patent No.: US 12,359,920 B2
(45) Date of Patent: Jul. 15, 2025

(54) NAUTICAL CHART PROCESSING DEVICE AND NAUTICAL CHART PROCESSING METHOD

(71) Applicant: Furuno Electric Co., Ltd., Nishinomiya (JP)

(72) Inventors: Jun Yamabayashi, OsakaSayama (JP); Masato Okuda, Kyoto (JP); Tomoko Fujimoto, Kobe (JP); Timo Kostiainen, Espoo (FI); Antti Kuukka, Espoo (FI)

(73) Assignee: FURUNO ELECTRIC CO., LTD., Nishinomiya (JP)

( * ) Notice: Subject to any disclaimer, the term of this patent is extended or adjusted under 35 U.S.C. 154(b) by 322 days.

(21) Appl. No.: 17/742,424

(22) Filed: May 12, 2022

(65) Prior Publication Data
US 2022/0364867 A1 Nov. 17, 2022

(30) Foreign Application Priority Data

May 14, 2021 (EP) .................................... 21173913

(51) Int. Cl.
*G01C 21/22* (2006.01)
*B63B 49/00* (2006.01)
*G01C 21/20* (2006.01)
*G06F 3/0488* (2022.01)

(52) U.S. Cl.
CPC .............. *G01C 21/22* (2013.01); *B63B 49/00* (2013.01); *G01C 21/203* (2013.01); *G06F 3/0488* (2013.01)

(58) Field of Classification Search
CPC .. G01C 21/22; G01C 21/203; G01C 21/3664; B63B 49/00; G06F 3/0488; G06F 3/04883; G09B 29/006
See application file for complete search history.

(56) References Cited

U.S. PATENT DOCUMENTS

| 2014/0250401 | A1  | 9/2014  | Matsumoto et al. |
| 2015/0054735 | A1* | 2/2015  | Nakama ................ G06F 3/0304 345/156 |
| 2015/0338974 | A1* | 11/2015 | Stone .................... G06F 3/0481 345/173 |
| 2016/0282126 | A1* | 9/2016  | Watts .................... G06Q 10/08 |

FOREIGN PATENT DOCUMENTS

| EP | 3709146 A1 | 9/2020 |
| WO | WO-2019093456 A1 * | 5/2019 ........... G01C 21/203 |

OTHER PUBLICATIONS

Machine Translation—WO-2019093456-A1 (Year: 2019).*
Extended European Search Report mailed on Oct. 26, 2021, received for EP Application 21173913.1, 8 pages.

* cited by examiner

*Primary Examiner* — Navid Z. Mehdizadeh
*Assistant Examiner* — Micah Chuen-Him Cheng
(74) *Attorney, Agent, or Firm* — XSENSUS LLP

(57) ABSTRACT

A nautical chart processing device is provided. The nautical chart processing device includes processing circuitry. The processing circuitry is configured to receive position information indicating position of a pair of base points on an electronic chart, set a movable measurement point on a straight line connecting the pair of base points in real time, calculate, on the electronic chart, a distance between the movable measurement point and at least one base point of the pair of base points, and output position information of the movable measurement point and the calculated distance.

23 Claims, 19 Drawing Sheets

NAUTICAL CHART PROCESSING DEVICE AND NAUTICAL CHART PROCESSING METHOD

CROSS-REFERENCE TO RELATED APPLICATION(S)

This application claims priority under 35 U.S.C. § 119 to European Patent Application No. 21173913.1, which was filed on May 14, 2021, the entire disclosure of which is hereby incorporated by reference.

TECHNICAL FIELD

An example embodiment of the present disclosure generally relates to a navigation display device for planning a navigation route and more particularly relates to providing a movable measurement point on the navigation display device for planning the navigation route.

BACKGROUND

Currently, various navigation display devices are available for planning a navigation route. For instance, the navigation display device may be an Electronic Chart Display and Information System (ECDIS). The ECDIS may display navigation route information for one or more vessels, where the one or more vessels are navigating through a water body, for example a river, or a sea or the like. The ECDIS may display a chart of a desired sea area on a display by performing software processing of electronic chart data. The ECDIS may comprise a touch sensitive display screen. Therefore, the navigation route may be set on the ECDIS displayed on the touch display screen by touching desired locations (also referred to as base points) on the chart. In addition to displaying the navigation route between the base points, the ECDIS may also display navigation distance, for instance, a distance between the base points.

However, the ECDIS may fail to provide measurements that involve complex operations, such as measuring distances between multiple base points and/or measuring an intermediate point between two base points. For example, the ECDIS may allow inputting base points on the electronic chart, but may not allow inputting an intermediate point between the base points. In these cases, conventional paper charts should be used for manually calculating the measurements that involve complex operation. However, the use of the conventional paper charts also has its limitations. For example, if the base point corresponds to a moving object, the measurements should be manually recalculated each time according to movements of the moving object, which makes the task challenging.

Accordingly, there is a need for a nautical chart processing device that is able to provide better calculations of distances between the base points such that the navigation display devices provide a hassle free user interface (UI) for planning the navigation route.

SUMMARY

In order to solve the foregoing problem, the present disclosure provides a nautical chart processing device. The nautical chart processing device is able to provide a better measurement of distances between the base points by setting a movable measurement point between a pair of base points. The nautical chart processing device comprises a processing circuitry configured to receive position information indicating position of a pair of base points on an electronic chart, set a movable measurement point on a straight line connecting the pair of base points, wherein the movable measurement point is movable in real time, calculate, on the electronic chart, a distance between the movable measurement point and at least one base point of the pair of base points, and output position information of the movable measurement point, and the calculated distance.

In additional nautical chart processing device embodiments, the processing circuitry is further configured to receive changed position of the at least one base point of the pair of base points; and change the movable measurement point. The position of the movable measurement point is changed within the straight line connecting the pair of base points.

In another aspect, the present disclosure provides a navigation display device. The navigation display device includes a nautical chart processing device. The nautical chart processing device comprises: a processing circuitry configured to receive position information indicating position of a pair of base points on an electronic chart, set a movable measurement point on a straight line connecting the pair of base points, wherein the movable measurement point is movable in real time, calculate, on the electronic chart, a distance between the movable measurement point and at least one base point of the pair of base points, and output position information of the movable measurement point, and the calculated distance. Further, the navigation display device includes: a display configured to display the pair of base points and the movable measurement point on the electronic chart; an input interface configured to receive an input corresponding to the position information of each of the pair of base points and the movable measurement point; a processing circuitry configured to store the electronic chart, and set a navigation route for a moving object.

In yet another aspect, the present disclosure provides a nautical chart processing method. The nautical chart processing method comprises: inputting position information indicating position of a plurality of base points on an electronic chart, wherein the plurality of base points is received as an input from a user; setting a movable measurement point on a straight line connecting adjacent base points of the plurality of base points, wherein the movable measurement point is at least one of a static movable measurement point or a movable measurement point that is changed in real time; calculating, on the electronic chart, a distance between the movable measurement point and at least one base point of the adjacent base points connected by the straight line; and outputting: position information of the movable measurement point and the calculated distance to a display part for displaying the position information of the movable measurement point and the calculated distance.

In yet another aspect, the present disclosure provides a non-transitory computer readable medium storing instructions that, when executed by one or more processors, cause a computing device to perform a method that comprises: inputting position information indicating position of a plurality of base points on an electronic chart, wherein the plurality of base points is received as an input from a user; setting a movable measurement point on a straight line connecting adjacent base points of the plurality of base points, wherein the movable measurement point is at least one of a static movable measurement point or a movable measurement point that is changed in real time; calculating, on the electronic chart, a distance between the movable measurement point and at least one base point of the adjacent base points connected by the straight line; and outputting position information of the movable measurement point and the calculated distance to a display part for displaying the position information of the movable measurement point and the calculated distance.

In accordance with various embodiments, the present disclosure proposes a navigation display device that provides a hassle free user interface (UI) for planning the navigation route for a moving object, such as a vessel navigating in a water body or to an aircraft navigating through an aviation path (or an aerial route). In order to provide the hassle free UI, the navigation display device may include a nautical chart processing device that is configured to provide a movable measurement point between base points. To provide the movable measurement point, the nautical chart processing device may receive the position information of a plurality of base points inputted from a user on an electronic chart. The position information may indicate a position for each base point of the plurality of base points. Further, the nautical chart processing device may set the movable measurement point on a straight line connecting adjacent base points of the plurality of base points. Furthermore, the nautical chart processing device may calculate, on the electronic chart, a distance between the movable measurement point and at least one base point of the adjacent base points and may output position information of the movable measurement point and the calculated distance for providing the movable measurement point on the electronic chart. For instance, the nautical chart processing device may provide the movable measurement point on the straight line connecting the adjacent base points such that the movable measurement point is changeable in real-time. Furthermore, the nautical chart processing device may recalculate the distance according to the change in the position of movable measurement point. Furthermore, if the base point corresponds to the moving object, the nautical chart processing device may recalculate the distance according to movements of the moving object and/or according to the change in the movable measurement point. Accordingly, the navigation display device that includes the nautical chart processing device may provide hassle free UI for planning the navigation route.

The foregoing summary is illustrative only and is not intended to be in any way limiting. In addition to the illustrative aspects, embodiments, and features described above, further aspects, embodiments, and features will become apparent by reference to the drawings and the following detailed description.

According to this disclosure, a navigation display device, a nautical chart processing device, and a nautical chart processing method are provided. The disclosure enables the navigation display device to provide a hassle free UI capable of receiving a plurality of base points on an electronic chart. The disclosure further enables the navigation display device to use the nautical chart processing device for providing the hassle free UI to plan a navigation route. In order to provide the hassle free UI, the disclosure enables the nautical chart processing device to provide, on the electronic chart, a movable measurement point on a straight line connecting adjacent base points of the plurality of base points. Furthermore, the disclosure enables the navigation display device to allow one or more base points of the plurality of base points to attract to a specific target on the electronic chart. The specific target may include a static object or a moving object.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Figure 1A:
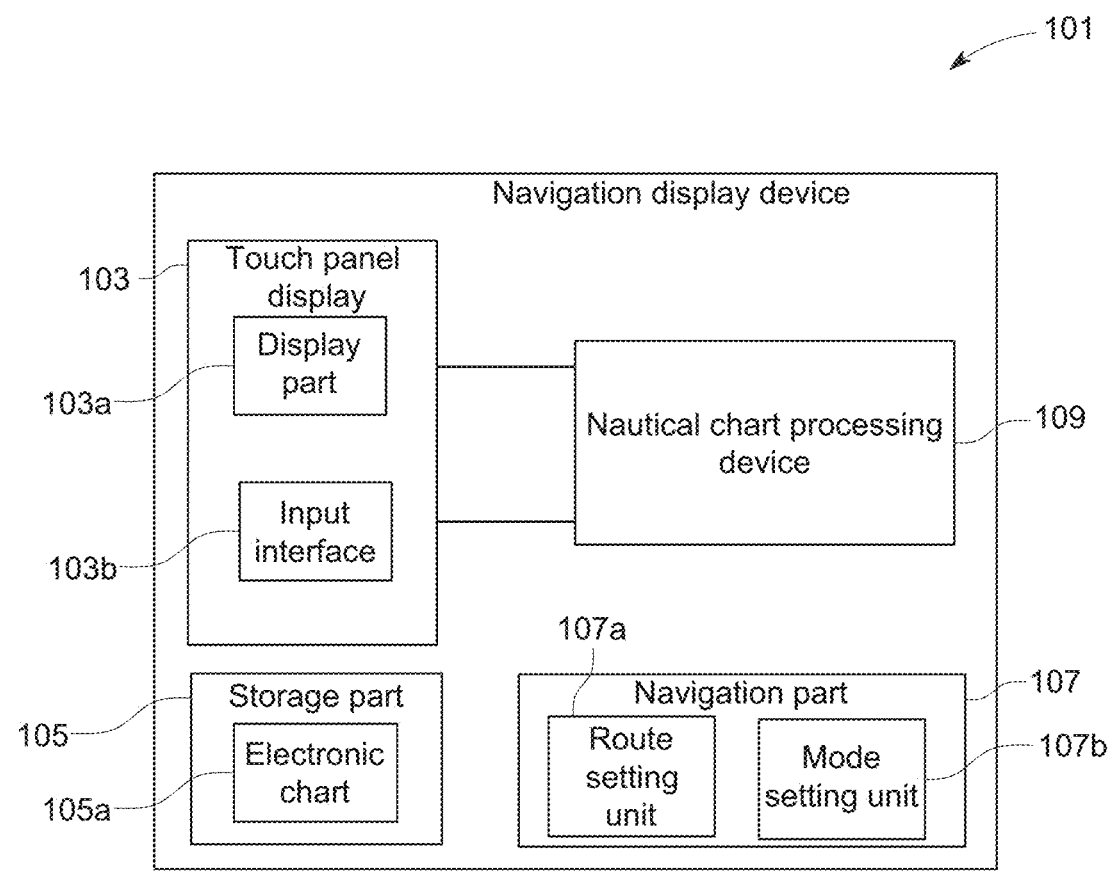
FIG. 1A illustrates a block diagram of a navigation display device, in accordance with an example embodiment of the present disclosure.

In the following description, for purposes of explanation, numerous specific details are set forth in order to provide a thorough understanding of the present disclosure. It will be apparent, however, to one skilled in the art that the present disclosure may be practiced without these specific details. In other instances, systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Further, the terms "processor", "controller" and "processing circuitry" and similar terms may be used interchangeably to refer to the processor capable of processing information in accordance with embodiments of the present disclosure. Further, the terms "electronic equipment", "electronic devices" and "devices" are used interchangeably to refer to electronic equipment monitored by the system in accordance with embodiments of the present disclosure. Thus, use of any such terms should not be taken to limit the spirit and scope of embodiments of the present disclosure.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

As used in this specification and claims, the terms "for example" "for instance" and "such as", and the verbs "comprising," "having," "including" and their other verb forms, when used in conjunction with a listing of one or more components or other items, are each to be construed as open ended, meaning that that the listing is not to be considered as excluding other, additional components or items. Other terms are to be construed using their broadest reasonable meaning unless they are used in a context that requires a different interpretation.

One of the objectives of the present disclosure is to provide a hassle free user interface for planning a navigation route. To this end, a navigation display device is provided. For instance, to provide the hassle free user interface, the navigation display device may use a nautical chart processing device that provides a movable measurement point between multiple base points. To provide the movable measurement point, the nautical chart processing device may receive the position information of a plurality of base points inputted by a user on an electronic chart. The position information may indicate a position for each base point of the plurality of base points. The plurality of base points may comprise a pair of base points in some scenarios. Further, the nautical chart processing device may set the movable measurement point on a straight line connecting adjacent base points of the plurality of base points. Furthermore, the nautical chart processing device may calculate, on the electronic chart, a distance between the movable measurement point and at least one base point of the adjacent base points and may output position information of the movable measurement point and the calculated distance for providing the movable measurement point on the electronic chart. For instance, the nautical chart processing device may provide the movable measurement point on the straight line connecting the adjacent base points such that the movable measurement point is changeable in real-time. Furthermore, the nautical chart processing device may recalculate the distance according to the change in the movable measurement point. Further, it is an objective of present disclosure to allow one or more base points of the plurality of base points to attract to a specific target on the electronic chart. The specific target may include a static object or a moving object. In a case, if the base point attracts to the moving object, the nautical chart processing device may recalculate the distance according to movements of the moving object and/or according to the change in the movable measurement point. For instance, an overview of the navigation display device for providing the hassle free user interface to plan a navigation route is provided below with reference to FIG. 1A.

FIG. 1A illustrates a block diagram of a navigation display device 101, in accordance with an example embodiment of the present disclosure. According to an embodiment, the navigation display device 101 may be installed at a watercraft. For example, the watercraft may include a vessel navigating in a water body. The navigation display device 101 may assist a user in planning nautical navigation. For instance, the navigation display device 101 may assist the user in planning the navigation route. As used herein, the 'nautical navigation' may refer to movements of the watercraft (e.g. the vessel) from one location to another location. The user may correspond to a captain, a navigation officer, a driver, a traveler, and the like. For example, the driver may be a helmsman, or a robot configured as helmsman.

In some embodiments, the navigation display device 101 may be installed in a moving object other than the watercraft, such as an aircraft.

According to an embodiment, the navigation display device 101 may include a touch panel display 103, a storage part 105, a navigation part 107, and a nautical chart processing device 109. According to an embodiment, the storage part 105 may be configured to store an electronic chart 105a. For example, the "chart" part of the electronic chart 105a may correspond to a nautical chart. For example, the "electronic" part of the electronic chart 105a may indicate the nautical chart is stored in an electronic form. Accordingly, the electronic chart 105a may correspond to the nautical chart stored in the electronic form. The storage part 105 may be embodied as a storage media such as a ROM (Read Only Memory), a RAM (Random Access Memory), a hard disk drive, or the like.

According to an embodiment, the touch panel display 103 may be configured to display the electronic chart 105a and receive, from the user, an input on the displayed electronic chart 105a. To this end, the touch panel display 103 may include a display part 103a and an input interface 103b. The display part 103a may display the electronic chart 105a. The input interface 103b may receive, from the user, the input on the displayed electronic chart 105a. For instance, the input interface 103b may be a touch panel (also referred to as a display panel) that receives, from the user, the input on the displayed electronic chart 105a, when the user touches the touch panel. Additionally, or alternatively, the input interface 103b may receive, from the user, the input on the displayed electronic chart 105a via a mouse, a keyboard, or the like, and accordingly the touch panel display may be replaced with any other known input technology prevalent in the art.

The navigation part 107 may be embodied in a processing circuitry or a processor. The processor may include one or more of a microprocessor, a coprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. According to an embodiment, the navigation part 107 may be configured to set a navigation route for the watercraft (e.g. the vessel). To this end, the navigation part 107 may include a route setting unit 107a and a mode setting unit 107b. The route setting unit 107a may be configured to set the navigation route for the watercraft (e.g. the vessel). For example, the navigation route may define directions for the movements of the watercraft, while traversing from one location to another location. The mode setting unit 107b is configured to set at least one mode for the navigation display device 101 such as, a measurement mode and a route setting mode. For example, the mode setting unit 107b may set the route setting mode, when the user selects the route setting mode option from the display part 103a. Additionally, the mode setting unit 107b is configured to switch from the measurement mode to the route setting mode or from the route setting mode to the measurement mode. According to embodiment, the route setting unit 107a may set the navigation route for the watercraft, when the mode setting unit 107b switches from the measurement mode to the route setting mode and/or when the mode setting unit 107b sets the route setting mode. Alternatively, the navigation part 107 may be configured to set a navigation route for an aircraft. According to an embodiment, when the mode setting unit 107b switches from the route setting mode to the measurement mode and/or when the mode setting unit 107b sets the measurement mode, the nautical chart processing device 109 may be configured to process information corresponding to the electronic chart 105a. For example, to process the information corresponding to the electronic chart 105a, the nautical chart processing device 109 may be configured as explained in the detailed description of FIG. 1B.

Figure 1B:
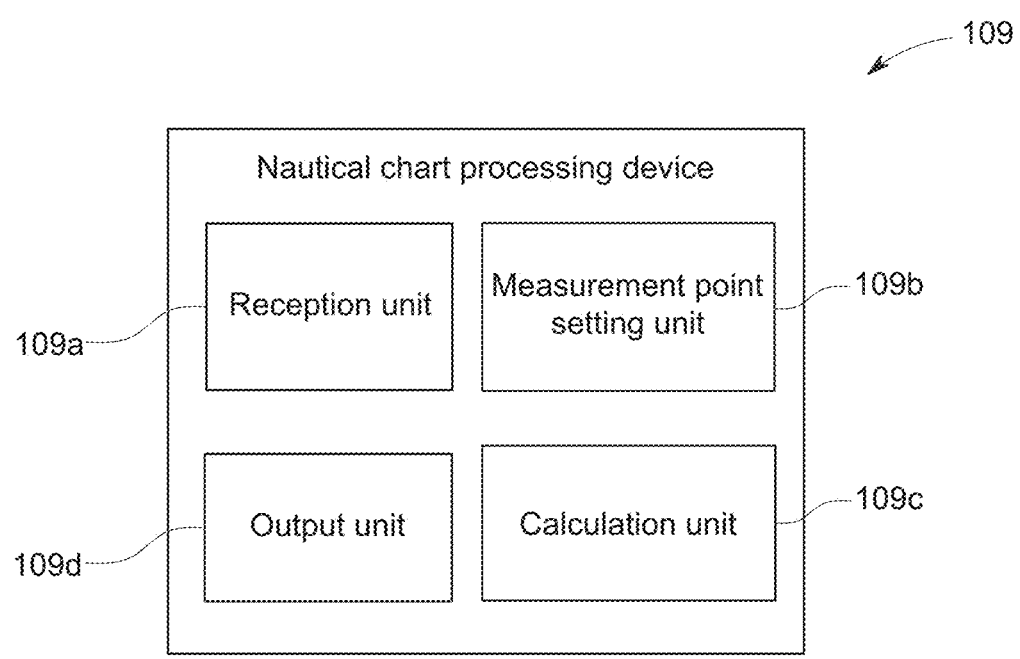
FIG. 1B illustrates a block diagram of a nautical chart processing device, in accordance with an example embodiment of the present disclosure.

FIG. 1B illustrates a block diagram of a nautical chart processing device 109, in accordance with an example embodiment of the present disclosure. FIG. 1B is explained in conjunction with FIG. 1A. According to an embodiment, the nautical chart processing device 109 may be embodied in the processor. The nautical chart processing device 109 may include a reception unit 109a, a measurement point setting unit 109b, a calculation unit 109c, and an output unit 109d. According to an embodiment, when the mode setting unit 107b sets the measurement mode, the reception unit 109a may be configured to receive position information indicating position of a pair of base points on the electronic chart 105a. In other words, when the mode setting unit 107b sets the measurement mode, the reception unit 109a may be configured to receive the position information indicating a pair of positions for the pair of base points on the electronic chart 105a, where each position is corresponding to a respective base point of the pair of base points. The position information of the pair of base points on the electronic chart 105a may be received from the user via the touch panel display 103. As used herein, the base point may correspond to a location selected by the user on the electronic chart 105a. According to an embodiment, the reception unit 109a may input the received position information of the pair of base points to the measurement point setting unit 109b.

Once the position information of the pair of base points is provided to the measurement point setting unit 109b from the reception unit 109a, the measurement point setting unit 109b may be configured to set a movable measurement point on a straight line connecting the pair of base points. The movable measurement point may be static or changeable/ that is changed (movable or dynamic) in real time. In some example embodiments, the measurement point setting unit 109b may use arrangement information to set the movable measurement point on the straight line connecting the pair of base points. The arrangement information may be determined based on one or more of an internal division ratio value between the pair of base points connected by the straight line and/or a setting distance from the at least one base point of the pair of base points connected by the straight line.

Once the movable measurement point is set by the measurement point setting unit 109b, the calculation unit 109c is configured to calculate, on the electronic chart 105a, a distance between the movable measurement point and at least one base point of the pair of base points connected by the straight line. Additionally, the calculation unit 109c is configured to calculate, using the calculated distance and a speed of the vessel, navigation time between the movable measurement point and at least one base point of the pair of base points connected by the straight line. Additionally, the calculation unit 109c is configured to calculate a direction (also referred to as an azimuth) in accordance with the position information of the pair of base points. Additionally, the calculation unit 109c is configured to calculate, on the electronic chart 105a, a distance between the pair of base points.

Once the distance between the movable measurement point and at least one base point of the pair of base points is calculated, the output unit 109d is configured to output position information of the movable measurement point and the calculated distance between the movable measurement point and the at least one base point of the pair of base points. According to an embodiment, the output unit 109d may output the position information of the movable measurement point and the calculated distance to the touch panel display 103 (preferably, the display part 103a). Additionally, the output unit 109d is configured to output the calculated navigation time, the calculated direction, and the calculated distance between the base points. The touch panel display 103 may be configured to display, on the electronic chart 105a, a position for the movable measurement point and the calculated distance between the movable measurement point and the at least one base point of the pair of base points. Additionally, the touch panel display 103 may be configured to display, on the electronic chart 105a, the calculated navigation time, the calculated direction, and the calculated distance between the base points.

In this way, the nautical chart processing device 109 is configured to process the position information of the pair of base points on the electronic chart 105a for outputting the movable measurement point and the calculated distance between the movable measurement point and at least one base point of the pair of base points. According to an embodiment, the measurement mode set by the mode setting unit 107b may include at least one of an input mode and an edit mode. Further, the nautical chart processing device 109 for processing, based on the input mode and the edit mode, the position information of the pair of base points and the position information of the movable measurement point is as explained in the detailed description of FIG. 2A-FIG. 6.

Figure 2A:
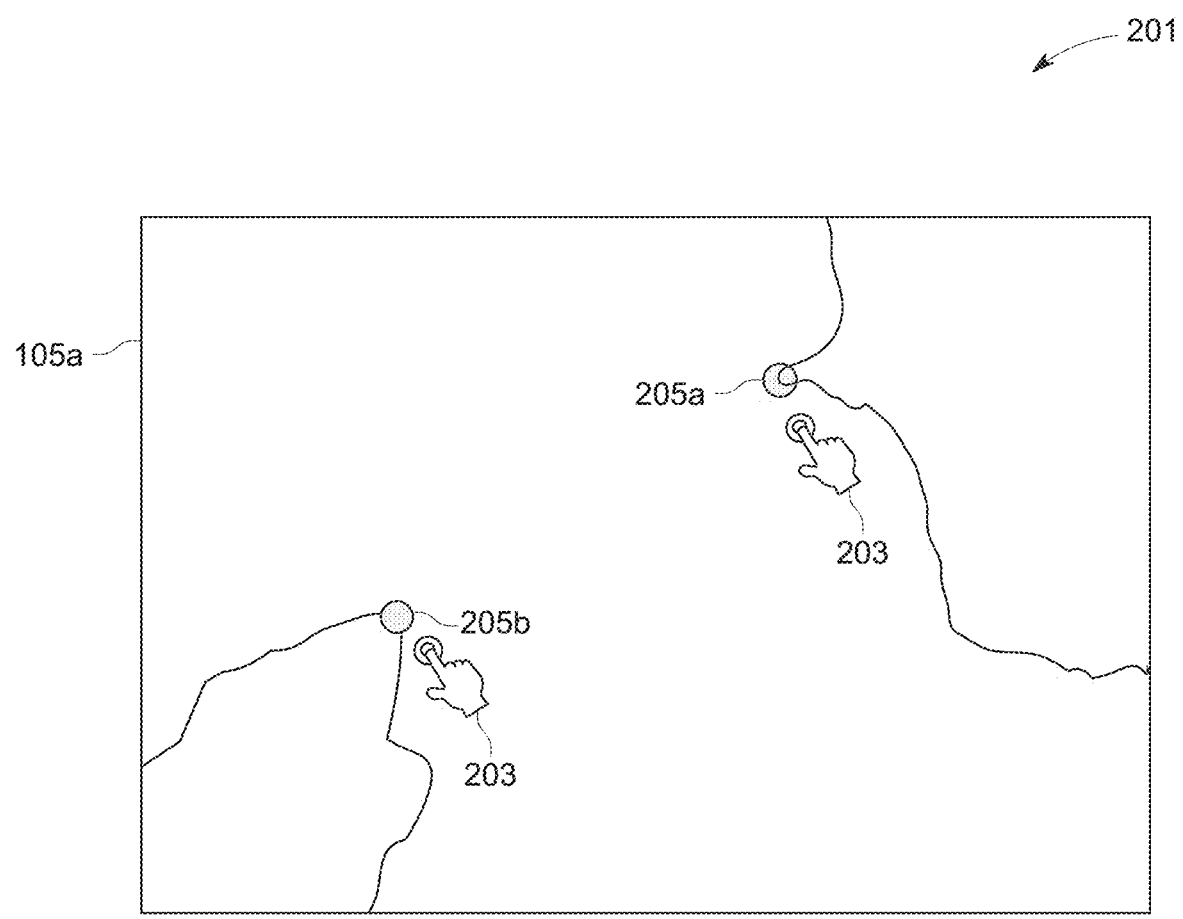
FIG. 2A illustrates a schematic view for inputting a pair of base points, in accordance with an example embodiment of the present disclosure.

FIG. 2A illustrates a schematic view 201 for inputting a pair of base points 205a and 205b, in accordance with an example embodiment of the present disclosure. FIG. 2A is explained in conjunction with FIG. 1A and FIG. 1B. The schematic view 201 may illustrate the electronic chart 105a displayed on the touch panel display 103. The navigation display device 101 may allow a user 203 to select, on the electronic chart 105a, the pair of base points 205a and 205b for the nautical navigation. The user 203 may correspond to a captain, a navigation officer, a driver, a traveler, and the like. For example, the driver may be helmsman or a robot configured as helmsman. According to an embodiment, the navigation display device 101 may allow the user 203 to select the pair of base points 205a and 205b, when the mode setting unit 107b sets the input mode (also referred to as a base point input mode). For example, the mode setting unit 107b sets the input mode, if the user 203 selects the input mode.

The user 203 may select the pair of base points 205a and 205b by touching the touch display panel 103 (preferably, the display panel) with the input mode selected. For example, the user 203 may touch the touch display panel 103 in a sequence of base point 205a and base point 205b to select the pair of base points 205a and 205b. Alternatively, the user 203 may select the pair of base points 205a and 205b by moving, on the display panel, a cursor of the mouse, by inputting numerical data via a keyboard, or the like.

Once the pair of base points 205a and 205b are selected, the reception unit 109a is configured to receive the position information indicating the position of each of the pair of base points 205a and 205b on the electronic chart 105a. In some example embodiments, the mode setting unit 107b may terminate the input mode, after selecting the pair of base points 205a and 205b. For example, if no input is received from the user 203 for a predefined time period after selecting the pair of base points 205a and 205b, the input mode may be automatically terminated by the mode setting unit 107b. Upon receiving the position information of the pair of base points 205a and 205b, the nautical chart processing device 109 is configured as explained in the detailed description of FIG. 2B.

Figure 2B:
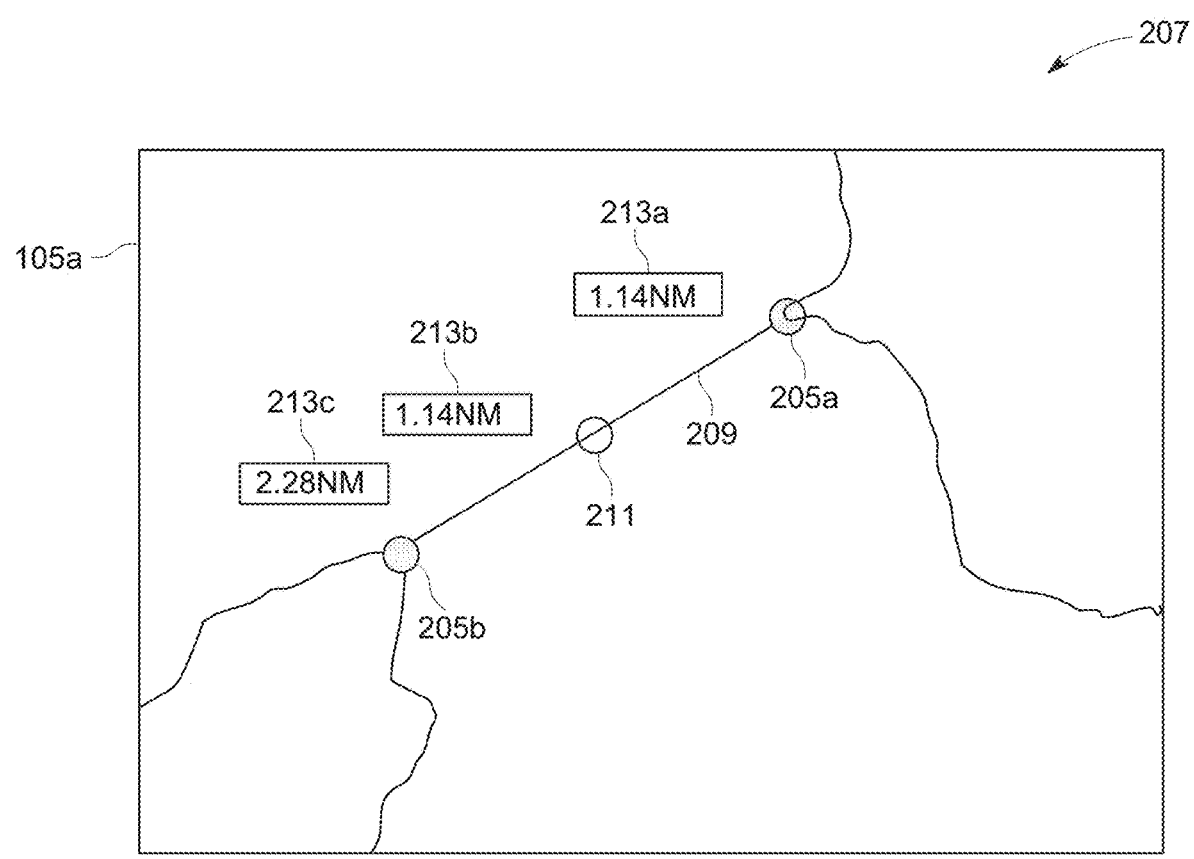
FIG. 2B illustrates a schematic view showing a position of a movable measurement point and calculated distances, in accordance with an example embodiment of the present disclosure.

FIG. 2B illustrates a schematic view 207 showing a position of a movable measurement point 211 and calculated distances 213a, 213b, and 213c, in accordance with an example embodiment of the present disclosure. FIG. 2B is explained in conjunction with FIG. 1A and FIG. 1B. The schematic view 207 may illustrate the electronic chart 105a displayed on the touch panel display 103. Once the position information of the pair of base points 205a and 205b is received, the measurement point setting unit 109b may be configured to set a line 209 (preferably, a straight line 209) between the base points 205a and 205b. Further, the measurement point setting unit 109b may be configured to set the movable measurement point 211 on the line 209 connecting the base points 205a and 205b. The movable measurement point 211 may be static or changed in real time.

The calculation unit 109c may be configured to calculate, on the electronic chart 105a, a distance 213a between the movable measurement point 211 and the base point 205a; a distance 213b between the movable measurement point 211 and the base point 205b, and a distance 213c between the base points 205a and 205b. Additionally, the calculation unit 109c may calculate the navigation time from the base point 205a to the movable measurement point 211, the navigation time from the movable measurement point 211 to the base point 205b, and/or the navigation time from the base point 205a to the base point 205b. For example, the calculation unit 109c may use the distance 213a and the speed of the vessel (or average speed of the vessel) to calculate the navigation time from the base point 205a to the movable measurement point 211. Similarly, the calculation unit 109c may use the distance 213b and the speed of the vessel (or average speed of the vessel) to calculate the navigation time from the movable measurement point 211 to the base point 205b. Additionally, the calculation unit 109c may calculate the direction in accordance with the position information of the base points 205a and 205b. The output unit 109d may be configured to output, to the display part 103a, the position information of the movable measurement point 211, the line 209 between the base points 205a and 205b, and the calculated distances 213a, 213b, 213c. For example, the distances 213a, 213b, 213c may be numerically equal to values 1.14 NM (Nautical Mile), 1.14 NM, and 2.28 NM respectively. The display part 103a may be configured to display, on the electronic chart 105a, the position of the movable measurement point 211, the line 209, and the calculated distances 213a, 213b, 213c, as illustrated in FIG. 2B. Notably, the movable measurement point 211 is set at a center (or a mid-point) of the line 209, but it is not limited to setting the movable measurement point 211 at the center of the line 209.

In some embodiments, the measurement point setting unit 109b may be configured to store arrangement information. According to an embodiment, the measurement point setting unit 109b may use the stored arrangement information as initial setting information for initially setting the movable measurement point 211. For example, the measurement point setting unit 109b may set the position information of the movable measurement point 211 according to the arrangement information. The arrangement information may be specified by the user 203. For example, the user 203 may specify the arrangement information by specifying an internal division ratio value (e.g., between 0~1) corresponding to an internal division of the line segment formed by the line 209 between the base points 205a and 205b and/or by specifying a setting distance from a base point (e.g., the base point 205a). For example, if the user 203 specifies the internal division ratio value from the base point 205a to the movable measurement point 211 is 0.4, the measurement point setting unit 109b may set the position of the movable measurement point 211 at a distance of numerical value 0.91 NM from the base point 205a (when the distance between the base points 205a and 205b is of a numerical value 2.28 NM). For example, if the user 203 specifies a numerical value of 1.0 NM as the setting distance from the base point 205a while specifying the arrangement information, the measurement point setting unit 109b may set the position of the movable measurement point 211 at a distance of numerical value 1.0 NM from the base point 205a. Accordingly, the arrangement information may be determined based on one or more of the internal division ratio value between the base points 205a and 205b or the setting distance specified from the base point 205.

Further, in some example embodiments, the navigation display device 101 may allow the user 203 to move, on the electronic chart 105a, the movable measurement point 211 in real time. For example, if the user 203 moves, on the electronic chart 105a, the movable measurement point 211, the nautical chart processing device 109 is configured as explained in the detailed description of FIG. 2C.

Figure 2C:
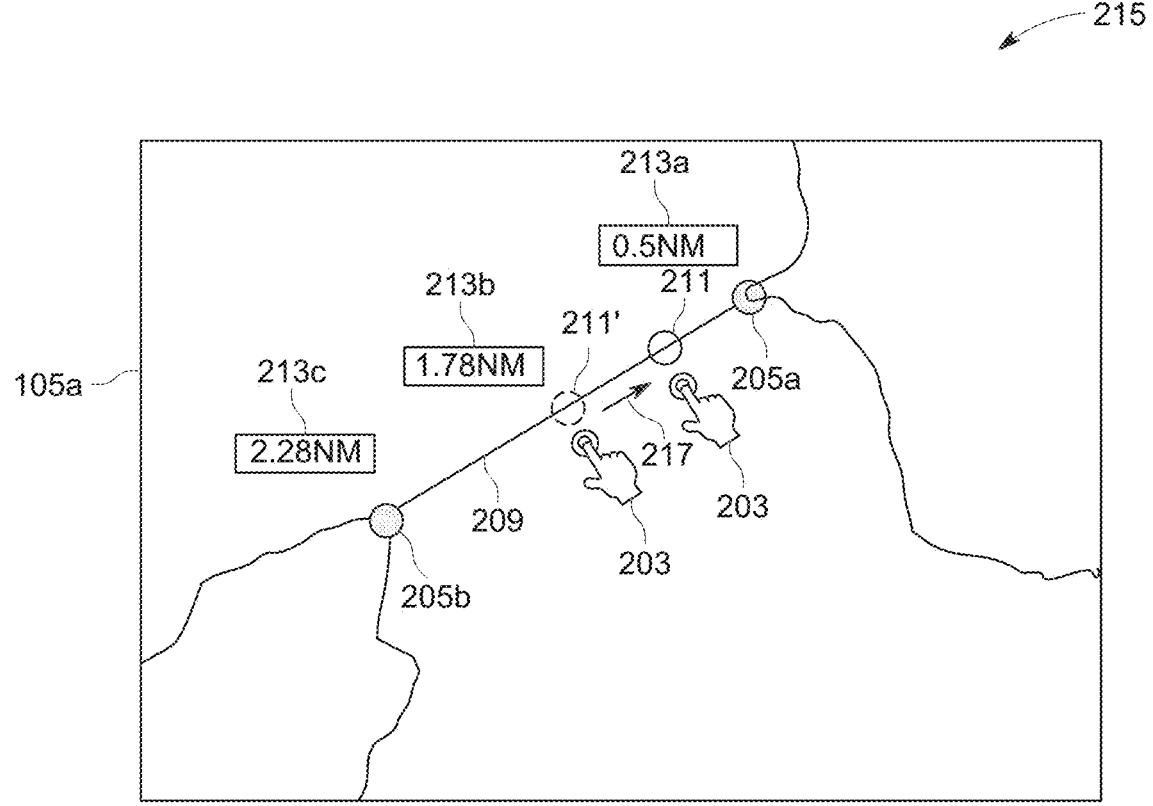
FIG. 2C illustrates a schematic view for changing the position of the movable measurement point, in accordance with an example embodiment of the present disclosure.

FIG. 2C illustrates a schematic view 215 for changing the position of the movable measurement point 211, in accordance with an example embodiment of the present disclosure. FIG. 2C is explained in conjunction with FIG. 1A and FIG. 1B. The schematic view 215 may illustrate the electronic chart 105a displayed on the touch panel display 103. According to an embodiment, the navigation display device 101 may allow the user 203 to move, on the electronic chart 105a, the movable measurement point 211, when the mode setting unit 107b sets the edit mode. For example, the mode setting unit 107b may set the edit mode, if the user 203 selects the edit mode. According to an embodiment, the edit mode set by the mode setting unit 107b may include at least one of a movable measurement point edit mode and a base point edit mode. In an example embodiment, the navigation display device 101 allows the user 203 to move, on the electronic chart 105a, the movable measurement point 211, when the mode setting unit 107b sets the movable measurement point edit mode. For example, the mode setting unit 107b may set the movable measurement point edit mode, if the user 203 selects the movable measurement point edit mode. Alternatively, the mode setting unit 107b may automatically set the movable measurement point edit mode after terminating the input mode (the base point input mode).

As illustrated in FIG. 2C, to move the movable measurement point 211, the user 203 may touch the movable measurement point 211 displayed on the electronic chart 105a and may move the movable measurement point 211 in a direction 217. For example, the direction 217 may indicate that the user 203 is moving the movable measurement point 211 towards the base point 205a. Alternatively, the user 203 may move the movable measurement point 211 in a direction opposite to the direction 217. For example, the user 203 may move the movable measurement point 211 towards the base point 205b (i.e. away from the base point 205a). Accordingly, the navigation display device 101 may allow the user 203 to move the movable measurement point 211 along the line 209 connecting the base points 205a and 205b. Alternatively, to move the movable measurement point 211, the user 203 may use the mouse, the keyboard, or the like.

When the movable measurement point 211 is moved, the reception unit 109a may be configured to receive new position information of the movable measurement point 211. The new position information of the movable measurement point 211 may indicate the movable measurement point 211 has been moved from an initial position to a new position. In FIG. 2C, a movable measurement point 211' may correspond to the movable measurement point 211, when the movable measurement point 211 was located at the initial position. The initial position may be the position of the movable measurement point 211 determined based on the arrangement information.

Upon receiving the new position information of the movable measurement point 211, the measurement point setting unit 109b may be configured to change the position of the movable measurement point 211. For example, the measurement point setting unit 109b may change the position of the movable measurement point 211 from the initial position to the new position. According to an embodiment, the measurement point setting unit 109b may be configured to change the position of the movable measurement point 211 within the line 209 connecting the base points 205a and 205b. In other words, the position of the movable measurement point 211 may be changed only within the line 209 by the measurement point setting unit 109b.

Once the position of the movable measurement point 211 is changed, the calculation unit 109c may be configured to recalculate the distance 213a between the base point 205a and the movable measurement point 211 and the distance 213b between the base point 205a and the movable measurement point 211. For example, the recalculated distances 213a and 231b may be numerically equal to 0.5 NM and 1.78 NM respectively. The distance 213c may remain same as previously calculated. For example, the distance 213c may be numerically equal to 2.28 NM. Additionally, the calculation unit 109c may be configured to recalculate the navigation time from the base point 205a to the movable measurement point 211 and/or the navigation time from the movable measurement point 211 to the base point 205b. For example, the calculation unit 109c may use the recalculated distance 213a and the speed of the vessel (or the average speed of the vessel) to recalculate the navigation time from the base point 205a to the movable measurement point 211. Similarly, the calculation unit 109c may use the recalculated distance 213b and the speed of the vessel (or the average speed of the vessel) to recalculate the navigation time from the movable measurement point 211 to the base point 205b.

The output unit 109d may be configured to output the recalculated distances 213a and 213b and the new position information of the movable measurement point 211 to the display part 103a. The display part 103a may display, on the electronic chart 105a, the recalculated distances 213a and 213b and the movable measurement point 211 at the new location, as illustrated in FIG. 2C.

In this way, the nautical chart processing device 109 may change the position of the movable measurement point 211, when the user 203 moves the movable measurement point 211 with the movable measurement point edit mode selected. For purpose of explanation, in FIG. 2A-FIG. 2C, the user 203 selecting two base points 205a and 205b are considered. However, the user 203 is allowed to select any finite number of base points on the electronic chart 105a. For example, if the user 203 selects more than two base points, the nautical chart processing device 109 may be configured as explained in the detailed description of FIG. 3A.

Figure 3A:
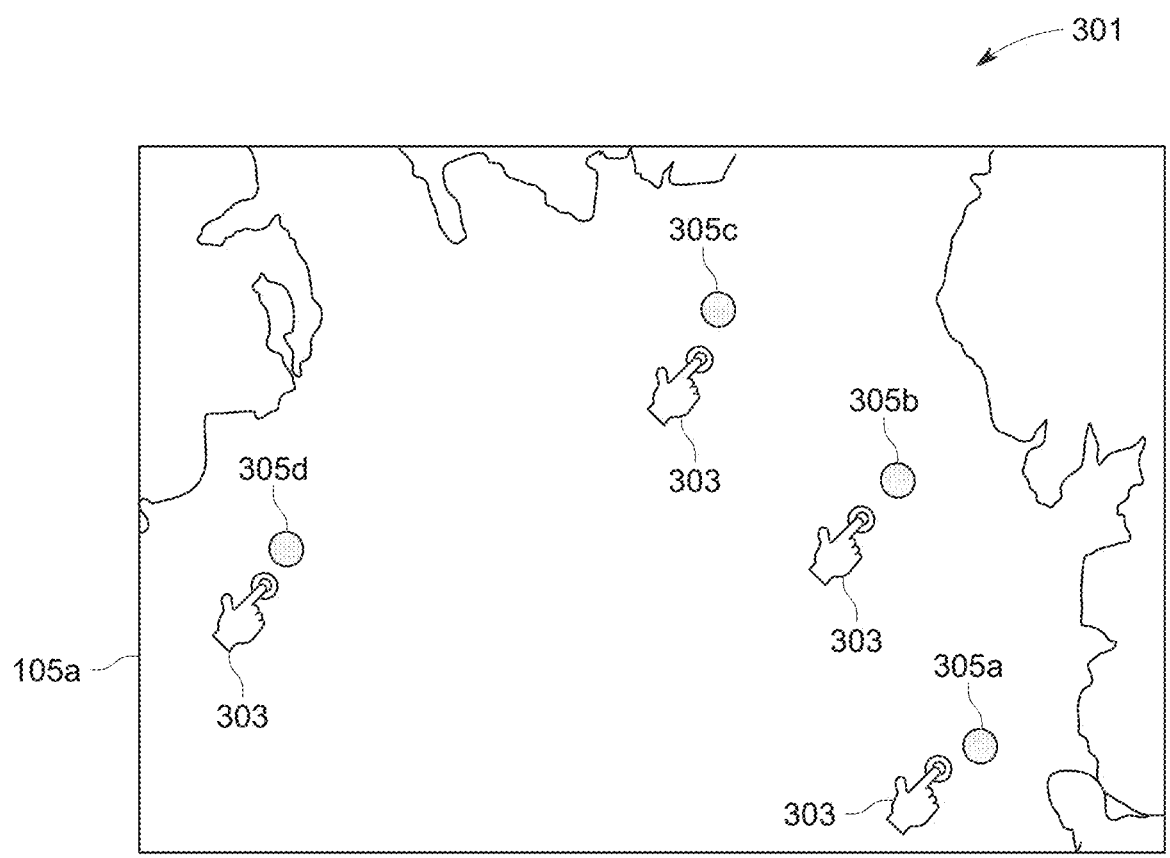
FIG. 3A illustrates a schematic view for inputting a plurality of base points, in accordance with another example embodiment of the present disclosure.

FIG. 3A illustrates a schematic view 301 for inputting a plurality of base points 305a, 305b, 305c, and 305d, in accordance with another example embodiment of the present disclosure. FIG. 3A is explained in conjunction with FIG. 1A and FIG. 1B. The schematic view 301 may illustrate the electronic chart 105a displayed on the touch panel display 103. According to an embodiment, the navigation display device 101 may allow a user 303 to select the plurality of base points 305a, 305b, 305c, and 305d, when the mode setting unit 107b sets the input mode. In other words, when the mode setting unit 107b sets the input mode, the navigation display device 101 may allow the user 203 to select a plurality of the pair of base point 305a, 305b, 305c, and 305d. For example, the mode setting unit 107b sets the input mode, if the user 203 selects the input mode. The user 303 may correspond to the user 203.

The user 303 may select the plurality of base points 305a, 305b, 305c, and 305d by touching the touch display panel 103 with the input mode selected. For example, the user 303 may touch the touch display panel 103 in a sequence of the base point 305a, the base point 305b, the base point 305c and the base point 305d to select the plurality of base points 305a, 305b, 305c, and 305d. Alternatively, the user 303 may select the plurality of base points 305a, 305b, 305c, and 305d by moving, on the touch display panel 103, a cursor of the mouse, by inputting numerical data via a keyboard, or the like.

Once the plurality of base points 305a, 305b, 305c, and 305d are selected, the reception unit 109a is configured to receive the position information indicating the position of each of the plurality of base points 305a, 305b, 305c, and 305d on the electronic chart 105a. In other words, once the plurality of the pair of base points 305a, 305b, 305c, and 305d are selected, the reception unit 109a is configured to receive the position information indicating the position of each of the plurality of the pair of base points 305a, 305b, 305c, and 305d on the electronic chart 105a. Upon receiving the position information of the plurality of base points 305a, 305b, 305c, and 305d, the nautical chart processing device 109 is configured as explained in the detailed description of FIG. 3B.

Figure 3B:
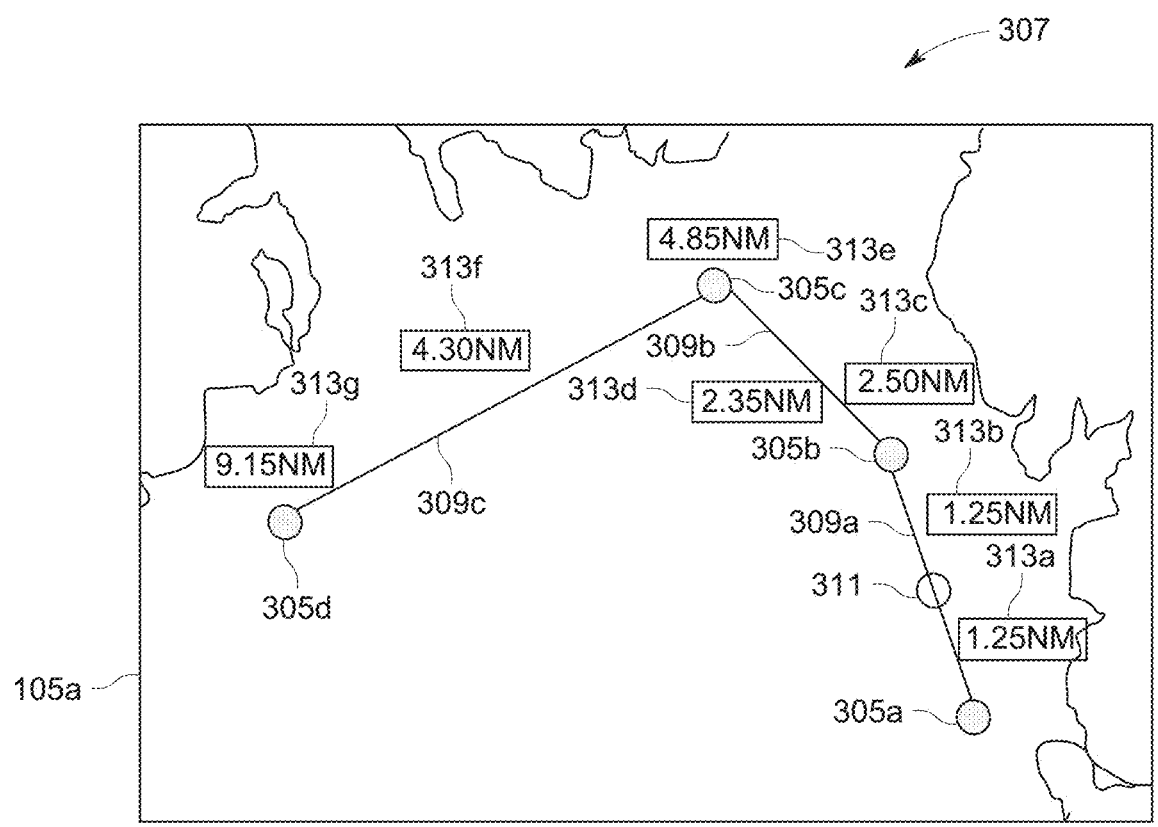
FIG. 3B illustrates a schematic view showing the position of the movable measurement point and the calculated distances, in accordance with another example embodiment of the present disclosure.

FIG. 3B illustrates a schematic view 307 showing a position of a movable measurement point 311 and calculated distances 313a, 313b, 313c, 313d, 313e, 313f, and 313g, in accordance with another example embodiment of the present disclosure. FIG. 3B is explained in conjunction with FIG. 1A and FIG. 1B. The schematic view 307 may illustrate the electronic chart 105a displayed on the touch panel display 103. Once the position information of the plurality of base points 305a, 305b, 305c, and 305d are received, the measurement point setting unit 109b may be configured to identify adjacent base points. For example, the measurement point setting unit 109b may identify, based on the sequence selected by the user 303, the base points 305a and 305b as first adjacent base points, the base points 305b and 305c as second adjacent base points, and the base points 305c and 305d as third adjacent base points. The measurement point setting unit 109b may be further configured to set a line 309a (preferably, a straight line 309a) between the first adjacent base points 305a and 305b. Similarly, the measurement point setting unit 109b may be further configured to set a line 309b (preferably, a straight line 309b) between the second adjacent base points 305b and 305c; and set a line 309c (preferably, a straight line 309c) between the third adjacent base points 305c and 305d. Furthermore, the measurement point setting unit 109b may be configured to set the movable measurement point 311 on the line 309a connecting the first adjacent base points 305a and 305b. For example, the measurement point setting unit 109b may set the movable measurement point 311 on the line 309a by using the arrangement information. Additionally, in some embodiments, the measurement point setting unit 109b may set an additional movable measurement point on the line 309b and/or on the line 309c.

The calculation unit 109c may be configured to calculate, on the electronic chart 105a, a distance 313a between the movable measurement point 311 and the base point 305a; a distance 313b between the movable measurement point 311 and the base point 305b, a distance 313c between the first adjacent base points 305a and 305b, a distance 313d between the second adjacent base points 305b and 305c, and a distance 313f between the third adjacent base points 305c and 305d. Additionally, the calculation unit 109c may be configured to calculate, on the electronic chart 105a, a distance 313e from the base point 305a to the base point 305c via the base point 305b. For example, the calculation unit 109c may calculate the distance 313e by adding the distances 313c and 313d. Additionally, the calculation unit 109c may be configured to calculate, on the electronic chart 105a, a distance 313g from the base point 305a to the base point 305d via the base point 305b and the base point 305c. For example, the calculation unit 109c may calculate the distance 313g by adding the distances 313c, 313d, and 313f.

The output unit 109d may be configured to output, to the display part 103a, the position information of the movable measurement point 311, the lines 309a, 309b, and 309c, and the calculated distances 313a, 313b, 313c, 313d, 313e, 313f, and 313g. For example, the distances 313a, 313b, 313c, 313d, 313e, 313f, and 313g may be numerically equal to values 1.25 NM, 1.25 NM, 2.50 NM, 2.35 NM, 4.85 NM, 4.30 NM, and 9.15 NM respectively. The display part 103a may be configured to display, on the electronic chart 105a, the position of the movable measurement point 311, the lines 309a, 309b, and 309c, and the calculated distances 313a, 313b, 313c, 313d, 313e, 313f, and 313g, as illustrated in FIG. 3B. In an embodiment, the calculated distances 313a, 313b, 313c, 313d, 313e, 313f, and 313g may be displayed after the input mode is terminated.

Further, in some example embodiments, the navigation display device 101 may allow the user 303 to move, on the electronic chart 105a, the movable measurement point 311 in real time. For example, if the user 303 moves the movable measurement point 311, the nautical chart processing device 109 may be configured as explained in the detailed description of FIG. 3C.

Figure 3C:
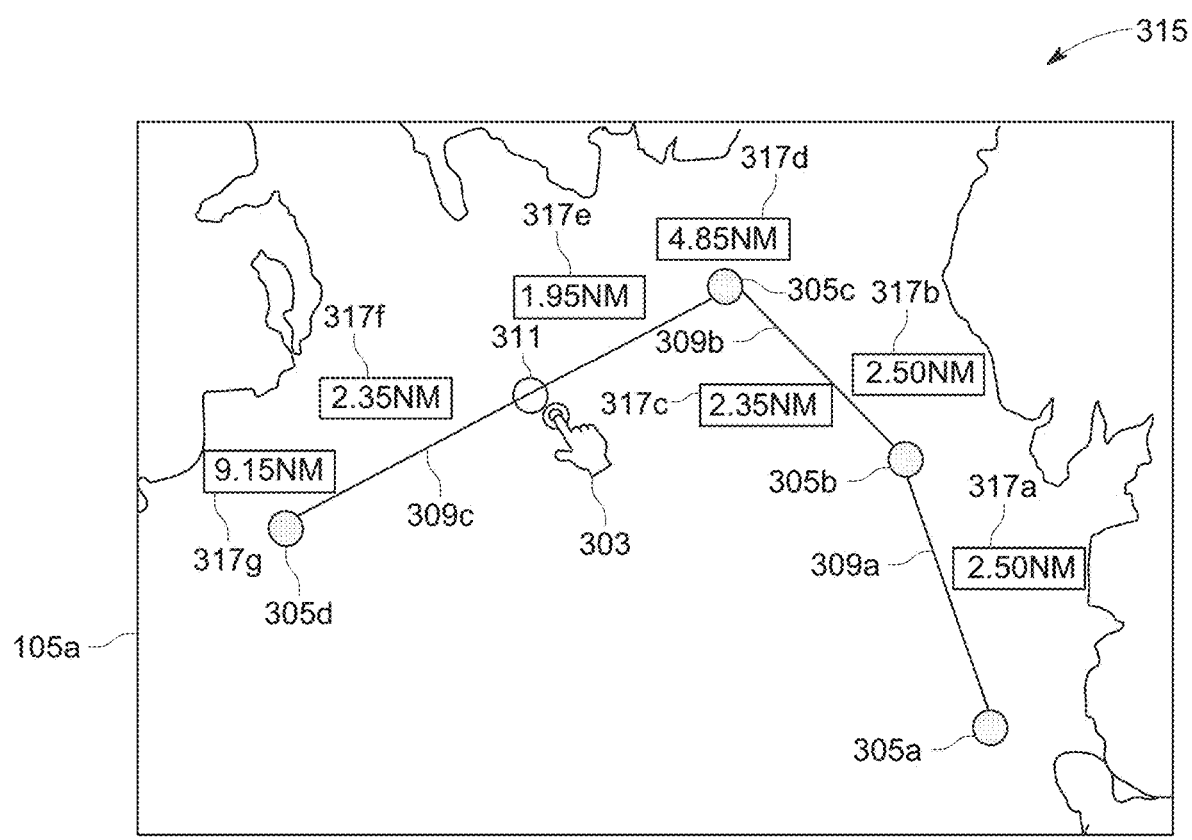
FIG. 3C illustrates a schematic view for changing the position of the movable measurement point, in accordance with another example embodiment of the present disclosure.

FIG. 3C illustrates a schematic view 315 for changing the position of the movable measurement point 311, in accordance with another example embodiment of the present disclosure. FIG. 3C is explained in conjunction with FIG. 1A and FIG. 1B. The schematic view 315 may illustrate the electronic chart 105a displayed on the touch panel display 103. According to an embodiment, the navigation display device 101 may allow the user 303 to move, on the electronic chart 105a, the movable measurement point 311, when the mode setting unit 107b sets the movable measurement point edit mode. For example, the mode setting unit 107b may set the movable measurement point edit mode, if the user 303 selects the movable measurement point edit mode. Alternatively, the mode setting unit 107b may automatically set the movable measurement point edit mode after terminating the input mode (the base point input mode).

As illustrated in FIG. 3C, to move the movable measurement point 311, the user 303 may touch the line 309c connecting the base point 305c and 305d. When the user 303 touches the line 309c, the movable measurement point 311 may disappear on the line 309a and appears on the line 309c to indicate the movable measurement point 311 has moved. Alternatively, the user 303 may move the movable measurement point 311 as explained in the detailed description of FIG. 3C. For example, the user 303 may move the movable measurement point 311 on the line 309a to the line 309c via the line 309b.

When the movable measurement point 311 is moved, the reception unit 109a may be configured to receive new position information of the movable measurement point 311. The new position information of the movable measurement point 311 may indicate the movable measurement point 311 has been moved from an initial position (e.g. a position on the line 309a) to a new position (e.g. a position on the line 309c).

Upon receiving the new position information of the movable measurement point 311, the measurement point setting unit 109b may be configured to change the position of the movable measurement point 311. For example, the measurement point setting unit 109b may change the position of the movable measurement point 311 from the initial position to the new position.

Once the position of the movable measurement point 311 is changed, the calculation unit 109c may be configured to recalculate a distance 317e between the base point 305c and the movable measurement point 311 and a distance 317f between the base point 305d and the movable measurement point 311. For example, distances 317a and 317b may correspond to the previously calculated distance 313c in the FIG. 3B. Similarly, distances 317c, 317d, and 317g may correspond to the previously calculated distances 313d, 313e, and 313g in the FIG. 3B, respectively. For example, the distances 317a, 317b, 317c, 317d, 317e, 317f, and 317g may be numerically equal to 2.50 NM, 2.50 NM, 2.35 NM, 4.85 NM, 1.95 NM, 2.35 NM, and 9.15 NM respectively.

The output unit 109d may be configured to output the distances 317a, 317b, 317c, 317d, 317e, 317f, and 317g and the new position information of the movable measurement point 311 to the display part 103a. The display part 103a may display, on the electronic chart 105a, the distances 317a, 317b, 317c, 317d, 317e, 317f, and 317g and the movable measurement point 311 on the line 309c, as illustrated in FIG. 3C.

In this way, the nautical chart processing device 109 may change the position of the movable measurement point 311, when the user 303 moves the movable measurement point 311 with the movable measurement point edit mode selected. For purpose of explanation, in FIG. 3A-FIG. 3C, the measurement point setting unit 109b configured to set one movable measure point 311 is considered. However, the measurement point setting unit 109b may be configured to set 'n'-finite number of movable measurement points, if the plurality of base points includes 'n'-finite number of adjacent base points. For example, in FIG. 3A-3C, the plurality of base points 305a, 305b, 305c, 305d include three adjacent base points, accordingly the measurement point setting unit 109b may be configured set three movable measurement points. Further, the nautical chart processing device 109 for setting a plurality of movable measurement points is as explained in FIG. 4.

Figure 4:
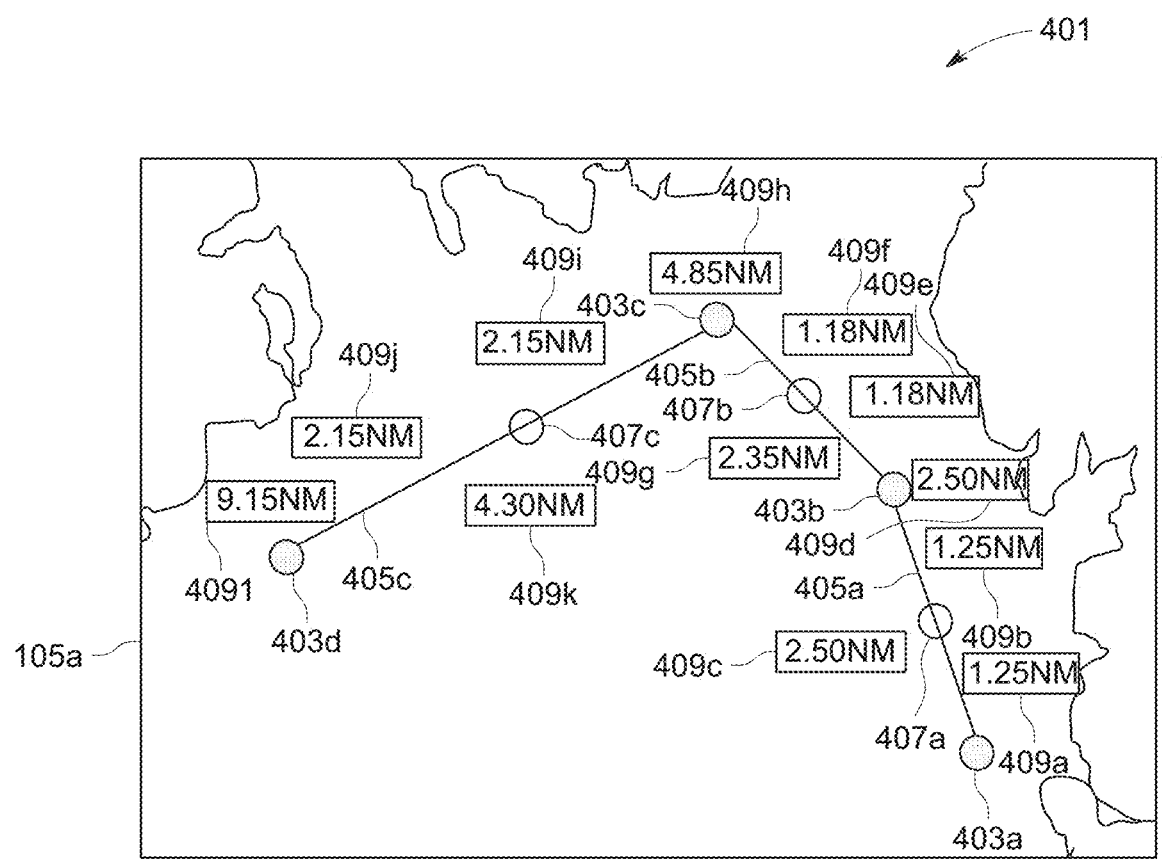
FIG. 4 illustrates a schematic view for setting a plurality of movable measurement points, in accordance with an example embodiment of the present disclosure.

FIG. 4 illustrates a schematic view 401 for setting a plurality of movable measurement points 407a, 407b, and 407c, in accordance with an example embodiment of the present disclosure. FIG. 4 is explained in conjunction with FIG. 1A and FIG. 1B. The schematic view 401 may illustrate the electronic chart 105a displayed on the touch panel display 103. A plurality of base points 403a, 403b, 403c, and 403d may correspond to the plurality of base points 305a, 305b, 305c, and 305d selected by the user 303, respectively. Once the plurality of base points 403a, 403b, 403c, and 403d are selected, the reception unit 109a may be configured to receive the position information indicating the position of each of the plurality of base points 403a, 403b, 403c, and 403d on the electronic chart 105a. The measurement point setting unit 109b may be configured to identify the adjacent base points. For example, the measurement point setting unit 109b may identify, based on the sequence selected, the base points 403a and 403b as the first adjacent base points, the base points 403b and 403c as the second adjacent base points, and the base points 403c and 403d as the third adjacent base points. The measurement point setting unit 109b may be further configured to set a line 405a (preferably, a straight line 405a) between the first adjacent base points 403a and 403b. Similarly, the measurement point setting unit 109b may be further configured to set a line 405b (preferably, a straight line 405b) between the second adjacent base points 403b and 403c; and set a line 405c (preferably, a straight line 405c) between the third adjacent base points 403c and 403d. Furthermore, the measurement point setting unit 109b may be configured to set a movable measurement point 407a on the line 405a connecting the first adjacent base points 403a and 403b. For example, the measurement point setting unit 109b may set the movable measurement point 407a on the line 405a by using the arrangement information. Similarly, the measurement point setting unit 109b may be configured to set a movable measurement point 407b on the line 405b connecting the second adjacent base points 403b and 403c; and set a movable measurement point 407c on the line 405c connecting the third adjacent base points 403b and 403c.

The calculation unit 109c may be configured to calculate, on the electronic chart 105a, a distance 409a between the movable measurement point 407a and the base point 403a; a distance 409b between the movable measurement point 407a and the base point 403b, a distance 409c between the first adjacent base points 403a and 403b, a distance 409e between the movable measurement point 407b and the base point 403b, a distance 409f between the movable measurement point 407b and the base point 403c, a distance 409g between the second adjacent base points 403b and 403c, and a distance 409i between the movable measurement point 407c and the base point 403c, a distance 409j between the movable measurement point 407c and the base point 403d, and a distance 409k between the third adjacent base points 403c and 403d. Additionally, the calculation unit 109c may be configured to calculate, on the electronic chart 105a, a distance 409d from the base point 403a to the base point 403b, a distance 409h from the base point 403a to the base point 403c via the base point 403b, and a distance 409l from the base point 403a to base point 403d via the base point 403b and the base point 403c. For example, the distance 409d may same as the distance 409c. For example, the calculation unit 109c may calculate the distance 409h by adding the distances 409d and 409g. For example, the calculation unit 109c may calculate the distance 409l by adding the distances 409h and 409k.

The output unit 109d may be configured to output, to the display part 103a, the position information indicating the position of each of the plurality of movable measurement points 407a, 407b, and 407c, the lines 405a, 405b, and 405c, and the calculated distances 409a, 409b, 409c, 409d, 409e, 409f, 409g, 409h, 409i, 409j, 409k, and 409l. For example, the distances 409a, 409b, 409c, 409d, 409e, 409f, 409g, 409h, 409i, 409j, 409k, and 409l may be numerically equal to values 1.25 NM, 1.25 NM, 2.50 NM, 2.50 NM, 1.18 NM, 1.18 NM, 2.35 NM, 4.85 NM, 2.15 NM, 2.15 NM, 4.30 NM, and 9.15 NM respectively. The display part 103a may be configured to display, on the electronic chart 105a, the positions of the plurality of movable measurement points 407a, 407b, 407c, the lines 405a, 405b, and 405c, and the calculated distances 409a, 409b, 409c, 409d, 409e, 409f, 409g, 409h, 409i, 409j, 409k, and 409l, as illustrated in FIG. 4. According to some embodiments, the display part 103a may be configured to display the distances (e.g. the distances 409c, 409g, and 409k) between the adjacent points with a different representation in comparison to the distances (e.g. the distances 407a, 407b, 409e, 409f, 409i and 409j) between the movable measurement points and the base points. Further, the display part 103a may be configured to display the distances (e.g. the distances 409d, 409h, 409l) from the base point 403a to other base points in the plurality of base points 403a, 403b, 403c and 403d with a different representation in comparison to the distances between the adjacent points and the distances between the movable measurement points and the base points. In other words, the display part 103a may display the distances 407a, 407b, 409e, 409f, 409i and 409j, the distances 409c, 409g, and 409k, and the distances 409d, 409h, 409l with three different representations for better user experience.

Further, in some example embodiments, the navigation display device 101 may allow the user to move, on the electronic chart 105a, each of the plurality of movable measurement points 407a, 407b, and 407c. For example, if the user moves any one of the movable measurement points 407a, 407b, and 407c, the nautical chart processing device 109 may be configured to change the position of the movable measurement point that the user moves, as explained in the detailed description of FIG. 2C.

Furthermore, in some example embodiments, the navigation display device 101 may allow the user to move, on the electronic chart 105a, the base point. For example, if the user moves the base point, the nautical chart processing device 109 may be configured as explained in the detailed description of FIG. 5A.

Figure 5A:
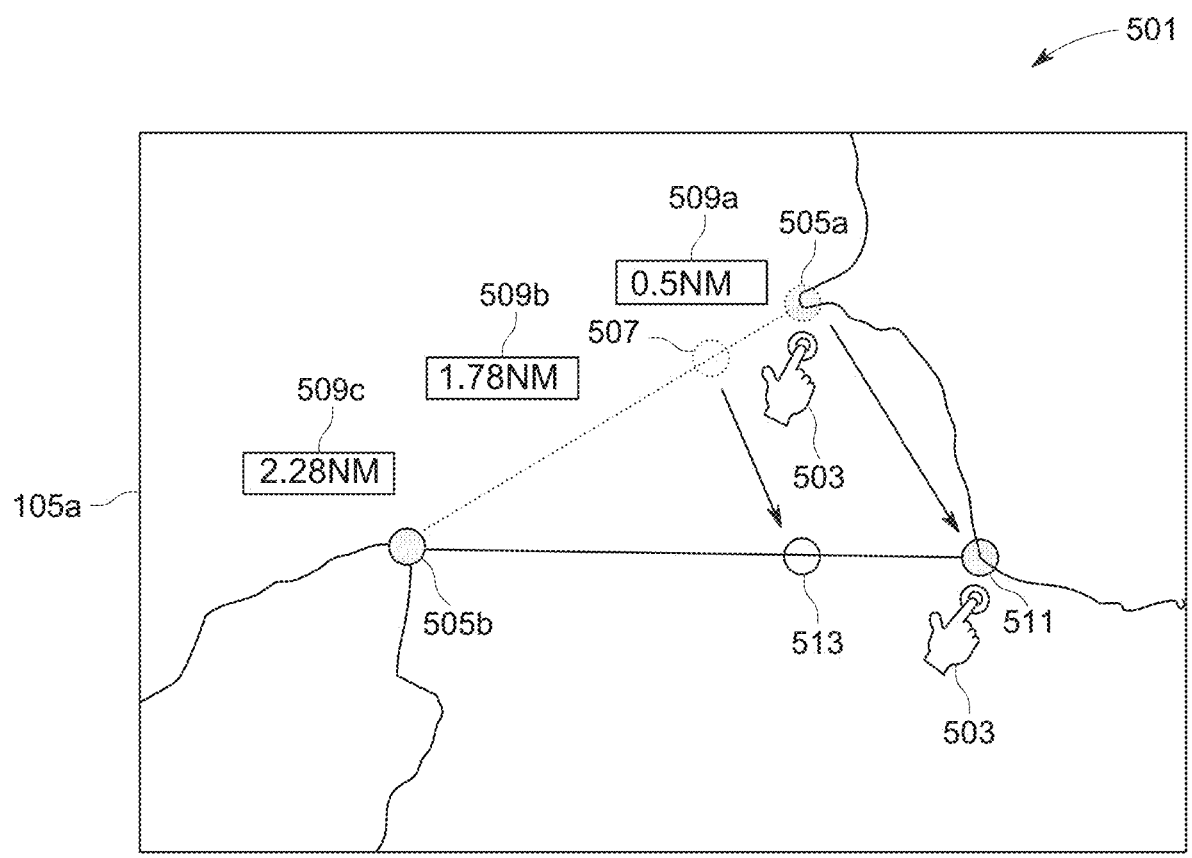
FIG. 5A illustrates a schematic view for moving a base point, in accordance with an example embodiment of the present disclosure.

FIG. 5A illustrates a schematic view 501 for moving a base point 505a, in accordance with an example embodiment of the present disclosure. FIG. 5A is explained in conjunction with FIG. 1A and FIG. 1B. The schematic view 501 may illustrate the electronic chart 105a displayed on the touch panel display 103. The schematic view 501 may include a pair of base points 505a and 505b, a movable measurement point 507, a distance 509a between the base point 505a and the movable measurement point 507, a distance 509b between the movable measurement point 507 and the base point 505b, a distance 509c between the base points 505a and 505b, a base point 511, and a movable measurement point 513. The pair of base points 505a and 505b may correspond to the pair of base points 205a and 205b respectively. The movable measurement point 507 may correspond to the movable measurement point 211. The distances 509a, 509b, and 509c may be calculated by the calculation unit 109c. For example, the distances 509a, 509b, and 509c may be numerically equal to 0.5 NM, 1.78 NM, and 2.28 NM respectively. The base point 511 may correspond to the base point 505a after a user 503 moves the base point 505a to a new position different from the position where the base point 505a was located. The user 503 may correspond to the user 203. The movable measurement point 513 may correspond to the movable measurement point 507 after the user 503 moves the base point 505a to the new location.

According an embodiment, the navigation display device 101 may allow the user 503 to move the base point 505a on the electronic chart 105a, when the mode setting unit 107b sets the base point edit mode. For example, the mode setting unit 107b may set the base point edit mode, if the user 503 selects the base point edit mode. For example, the user 503 may select the base point edit mode from a menu option. Alternatively, the user 503 may select the base point edit mode by placing a finger of the user 503 on the base point for a certain period of time.

As illustrated in FIG. 5A, to move the base point 505a, the user 503 may place the finger of the user 503 on the base point 505a for the certain period of time and may move the base point 505a. In other words, the user 503 modifies the base point 505a to the base point 511. When the base point 505a is modified to base point 511, the nautical chart processing device 109 may be configured as explained in the detailed description of FIG. 5B.

Figure 5B:
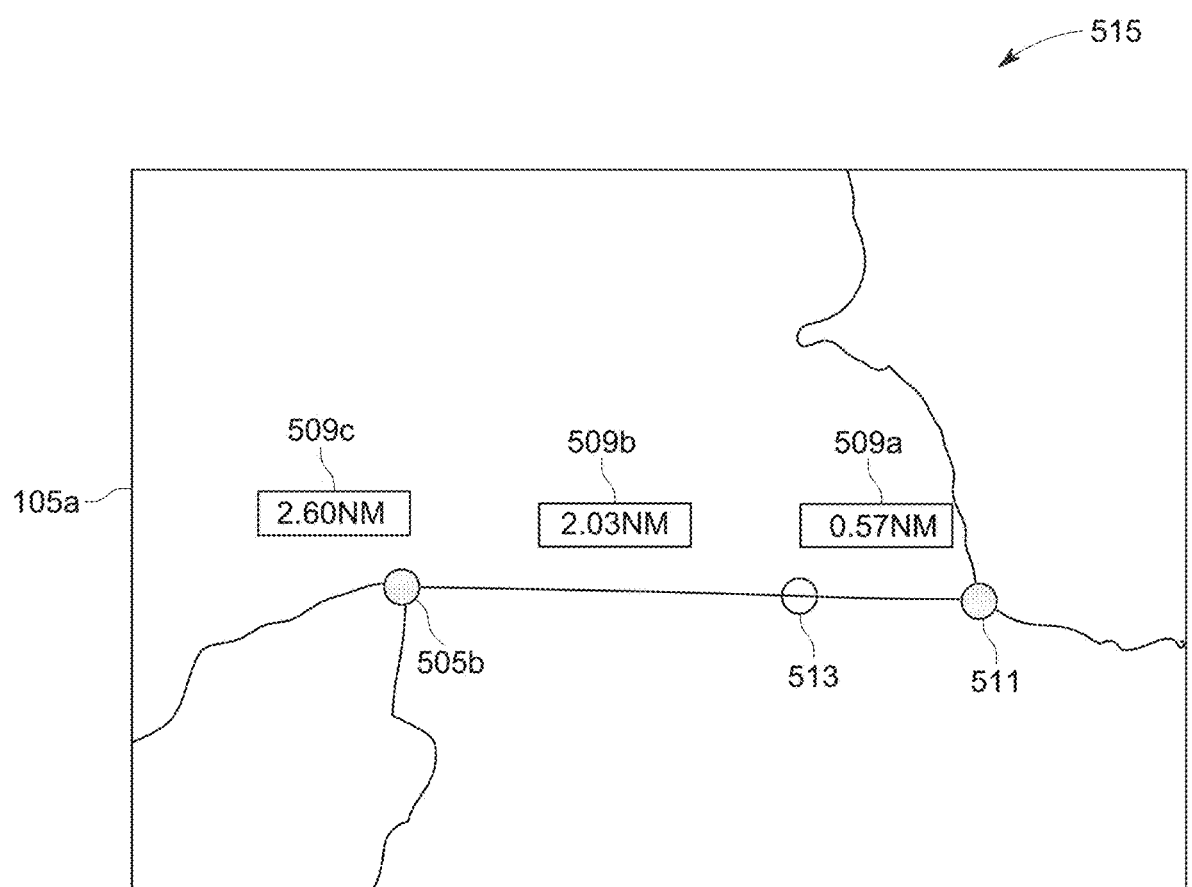
FIG. 5B illustrates a schematic view for displaying the base point after moving as shown in FIG. 5A, in accordance with an example embodiment of the present disclosure.

FIG. 5B illustrates a schematic view 515 for displaying the base point 511, in accordance with an example embodiment of the present disclosure. FIG. 5B is explained in conjunction with FIG. 1A, FIG. 1B, and FIG. 5A. The schematic view 515 may illustrate the electronic chart 105a displayed on the touch panel display 103. Once the base point 505a is modified to the base point 511, the reception unit 109a may be configured to receive position information indicating a position of the base point 511. In other words, the reception unit 109a may be configured to receive position information indicating a changed position of the base point 505a (e.g., the base point 511).

According to an embodiment, before changing the position of the base point 505a to represent the base point 511, the measurement point setting unit 109b may be further configured to reset a line (preferably, a straight line) between the base point 505a and the base point 505b. Further, before changing the position of the base point 505a to represent the base point 511, the measurement point setting unit 109b may be configured to change the movable measurement point 507 to the movable measurement point 513. For example, the measurement point setting unit 109b may change the position information of the movable measurement point 507 to represent the movable measurement point 513 such that the movable measurement point 513 is on the reset line. In an embodiment, to change the movable measurement point 507 to the movable measurement point 513, the measurement point setting unit 109b may be configured to set a position of the movable measurement point 513. In other words, the measurement point setting unit 109b may set the position of the movable measurement point 513 for changing the movable measurement point 507 to the movable measurement point 513.

In some embodiments, the measurement point setting unit 109b may be configured to set the position of the movable measurement point 513 by using the arrangement information. In an embodiment, the arrangement information may be determined based on the internal division ratio value between the base points 505a and 505b of the movable measurement point 507 before changing the base point 505a to the base point 511. In this example embodiment, the measurement point setting unit 109b may be configured to set the position of the movable measurement point 513 based on the internal division ratio value corresponding to the internal division of the line segment between the base points 505a and 505b, as defined by the arrangement information of the movable measurement point 507 before changing the base point 505a to the base point 511. In another embodiment, the arrangement information may be determined based on the setting distance specified (by the user 503) from the base point 505a to the movable measurement point 507 before changing the base point 505a to the base point 511. In this example embodiment, the measurement point setting unit 109b may be configured to set the position of the movable measurement point 513 based on the setting distance specified (by the user 503) from the base point 505a to the movable measurement point 507 before changing the base point 505a to the base point 511.

In some other embodiments, if the user 503 has moved the movable measurement point 507 on a line connecting the base points 505a and 505b before changing the base point 505a to the base point 511, the measurement point setting unit 109b may be configured to store a recent internal division ratio value and/or a recent setting distance acquired by the user 503 as the arrangement information. In these embodiments, the measurement point setting unit 109b may be configured to set the position of the movable measurement point 513 on the reset line connecting the base point 511 and the base point 505*b* at a position corresponding to the arrangement information. In an embodiment, the arrangement information may include the recent internal division ratio value that internally divides the line connecting base points 505*a* and 505*b*. For instance, the recent internal division ratio value may be a value (between 0 and 1) from the base point 505*a* to the movable measurement point 507 determined after the user 503 has moved the movable measurement point 507 on the line connecting the base points 505*a* and 505*b*, before changing the base point 505*a* to the base point 511. For example, the recent internal division ratio value from the base point 505*a* to the movable measurement point 507 may be numerical determined by dividing the distance 509*a* by the distance 509*c*, if the user 503 has moved the movable measurement point 507 on the line connecting the base points 505*a* and 505*b* before changing the base point 505*a* to the base point 511. In this example embodiment, the measurement point setting unit 109*b* may be configured to set the position of the movable measurement point 513 with the recent internal division ratio value that internally divides the line connecting base points 505*a* and 505*b*, before changing the base point 505*a* to the base point 511. In another embodiment, the arrangement information may include the recent setting distance from the base point 505*a* to the movable measurement point 507 after the user 503 has moved the movable measurement point 507 on the line connecting the base points 505*a* and 505*b* and before changing the base point 505*a* to the base point 511. For example, the recent setting distance from the base point 505*a* to the movable measurement point 507 may be numerical equal to the distance 509*a*, if the user 503 has moved the movable measurement point 507 on the line connecting the base points 505*a* and 505*b* before changing the base point 505*a* to the base point 511. In this example embodiment, the measurement point setting unit 109*b* may be configured to set the position of the movable measurement point 513 based on the recent setting distance from the base point 505*a* to the movable measurement point 507 before changing the base point 505*a* to the base point 511.

Once the movable measurement point 507 is changed to the movable measurement point 513, the calculation unit 109*c* may be configured to recalculate the distance 509*a* between the base point 511 and the movable measurement point 513, the distance 509*b* between the base point 505*b* and the movable measurement point 513, the distance 509*c* between the base points 511 and 505*b*. For example, the recalculated distances 509*a*, 509*b*, and 509*c* may be numerically equal to 0.57 NM, 2.03 NM, and 2.60 NM respectively. Additionally, the calculation unit 109*c* may be configured to recalculate the navigation time from the base point 511 to the movable measurement point 513, the navigation time from the movable measurement point 513 to the base point 505*b*, and/or the navigation time from the base point 511 to the base point 505*b*. For example, the calculation unit 109*c* may use the recalculated distance 509*a* and the speed of the vessel (or the average speed of the vessel) to recalculate the navigation time from the base point 511 to the movable measurement point 513. Similarly, the calculation unit 109*c* may use the recalculated distance 509*b* and the speed of the vessel (or the average speed of the vessel) to recalculate the navigation time from the movable measurement point 513 to the base point 505*b*. Additionally, the calculation unit 109*c* may be configured to recalculate the direction in accordance with the position information of base points 511 and 505*b*.

The output unit 109*d* may be configured to output the recalculated distances 509*a*, 509*b*, and 509*c*, the position information of the base points 511 and 505*b*, and the position information of the movable measurement point 513 to the display part 103*a*. The display part 103*a* may display, on the electronic chart 105*a*, the recalculated distances 509*a*, 509*b*, and 509*c*, the base points 511 and 505*b*, and the movable measurement point 513, as illustrated in FIG. 5B.

In this way, the nautical chart processing device 109 may change the position of the base point 505*a* to represent the base point 511, when the user 503 moves the base point 505*a* with base point edit mode selected. Further, in some embodiments, the navigation display device 101 may allow the user 503 to move the base point to a specific target. For example, if the user 503 moves the base point to the specific target, the nautical chart processing device 109 is configured as explained in the detailed description of FIG. 6.

Figure 6:
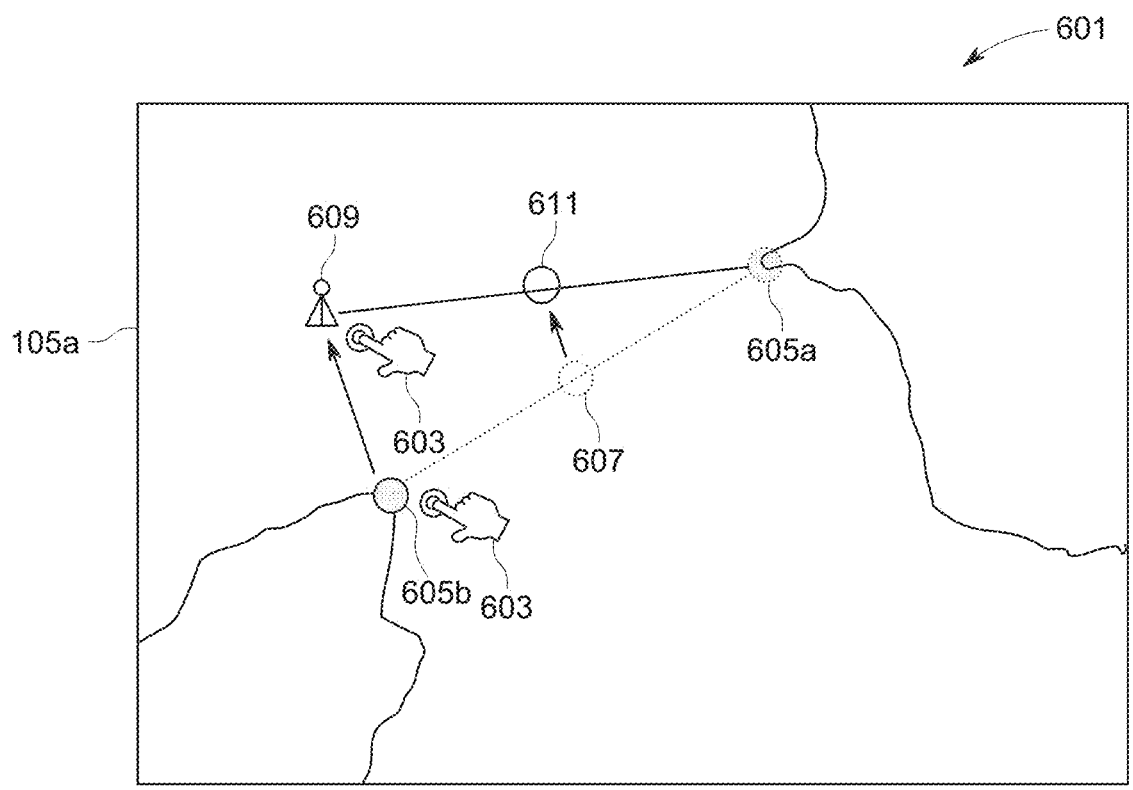
FIG. 6 illustrates a schematic view for moving a base point, in accordance with another example embodiment of the present disclosure.

FIG. 6 illustrates a schematic view 601 for moving a base point 605*b*, in accordance with another example embodiment of the present disclosure. FIG. 6 is explained in conjunction with FIG. 1A and FIG. 1B. The schematic view 601 may illustrate the electronic chart 105*a* displayed on the touch panel display 103. The schematic 601 may include a plurality of base points 605*a* and 605*b*, a movable measurement point 607, a specific target 609, and a movable measurement point 611. The plurality of base points 605*a* and 605*b* may correspond to the plurality of base points 505*a* and 505*b*, respectively. The movable measurement point 607 may correspond to the movable measurement point 507. The specific target 609 may comprise one or more of a moving object or a static object. For example, the static object may include at least one of a buoy, a lighthouse, or the like. For example, the moving object may include at least one of the vessel in which the navigation display device 101 is installed, another vessel on the water body, an echo of any moving object, or the like. The movable measurement point 611 may correspond to the movable measurement point 607 after a user 603 moves the base point 605*b* to a position indicating the specific target 609. The user 603 may correspond to the user 503.

According to an embodiment, the navigation display device 101 may allow the user 603 to move, on the electronic chart 105*a*, the base point 605*b* (or the base point 605*a*) to the position of the specific target 609, when the mode setting unit 107*b* sets the base point edit mode. For example, the mode setting unit 107*b* may set the base point edit mode, if the user 603 selects the base point edit mode. For example, the user 603 may select the base point edit mode from the menu option. Alternatively, the user 603 may select the base point edit mode by placing a finger of the user 603 on the base point for the certain period of time.

As illustrated in FIG. 6, to move the base point 605*b*, the user 603 may place the finger of the user 603 on the base point 605*b* for the certain period of time and may move the base point 605*b* to the position of the specific target 609. In other words, the user 603 modifies the position of the base point 605*b* to the position of the specific target 609. Once the position of the base point 605*b* is modified to the position of the specific target 609, the nautical chart processing device 109 may be configured to replace position information indicating the position of the base point 605*b* with position information indicating the position of the specific target 609 on the electronic chart 105*a*. In an embodiment, the nautical chart processing device 109 may replace the position information indicating the position of the base point 605*b* with the position information indicating the position of the specific target 609 such that the base point 605*b* is attracted (snipped) to the specific target 609. Additionally, the nautical chart processing device 109 may replace the position information indicating the position of the base point 605b with the position information indicating the position of the specific target 609, when the position information of the base point 605b is within a predetermined range from the position information of the specific target 609 on the electronic chart 105a. Further, the nautical chart processing device 109 may configured to change the movable measurement point 607 to the movable measurement point 611 and calculate a distance between the base point 605a and the movable measurement point 611, a distance between the movable measurement point 611 and the specific target 609, and a distance between the base point 605a and the specific target 609, as explained in the detailed description of FIG. 5B.

According to some embodiments, when the base point 605b is replaced with the moving object and if the moving object is moving, the nautical chart processing device 109 may configured to continuously change, in accordance with the moving object, the position information of the base point 605b, the movable measurement point 607, the previously calculated distances. For purpose of explanation, in FIG. 6, the navigation display device 101 allowing the user 603 to move, on the electronic chart 105a, the base point 605b (or the base point 605a) to the position of the specific target 609 is considered. However, in some implementations, the navigation display device 101 allow the user 603 to directly input the position information of the specific target 609, while inputting at least one of the base points 605a or the base point 605b.

In this way, the nautical chart processing device 109 may change the position of the base point 605b to the position of the specific target 609, when the user 603 moves the base point 605b to the specific target 609 with the base point edit mode selected. Furthermore, the navigation display device 101 may allow the user 603 to specify a navigation route using the base points (e.g. the base points 605a and 605b) and the moveable measurement point (e.g. the movable measurement point 611). For instance, to allow the user to specify the navigation route, the navigation display device 101 may be configured as explained in the detailed description of FIG. 7.

Figure 7:
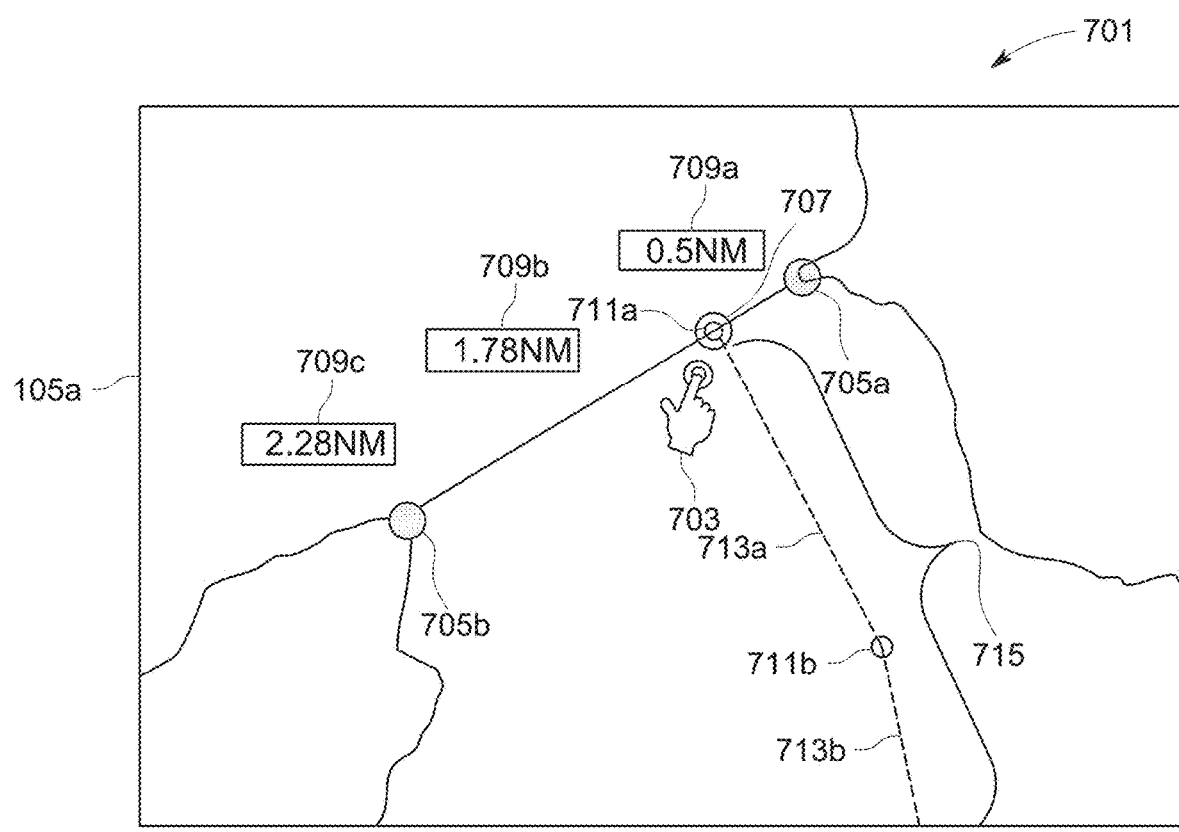
FIG. 7 illustrates a schematic view for setting a navigation route, in accordance with an example embodiment of the present disclosure.

FIG. 7 illustrates a schematic view 701 for setting a navigation route 715, in accordance with an example embodiment of the present disclosure. FIG. 7 is explained in conjunction with FIG. 1A and FIG. 1B. The schematic view 701 may illustrate the electronic chart 105a displayed on the touch panel display 103. The schematic view 701 may include a plurality of base points 705a and 705b, a movable measurement point 707, a distance 709a between the base point 705a and the movable measurement point 707, a distance 709b between the base point 705b and the movable measurement point 707, and a distance 709c between the base points 705a and 705b, a plurality of way points 711a and 711b, and a plurality of route lines 713a and 713b, and the navigation route 715. The plurality of base points 705a and 705b may correspond to the plurality of base points 205a and 205b respectively. The movable measurement point 707 may correspond to the movable measurement point 211 set by the measurement point setting unit 109b. The distances 709a, 709b, and 709c may be calculated by the calculation unit 109c. For example, the distances 709a, 709b, and 709c may be calculated based on at least one of the movable measurement point 707 set after inputting the base points 705a and 705b with the base point input mode selected, the movable measurement point 707 set after changing the position of the movable measurement point 707 with the movable measurement point edit mode selected, and/or the movable measurement point 707 set after changing at least one of the base points 705a or 705b with the base point edit mode selected. For example, the distances 709a, 709b, and 709c may be numerically equal to 0.5 NM, 1.78 NM, and 2.28 NM respectively.

The navigation display device 101 may allow a user 703 to select the plurality of way points 711a and 711b for specifying the navigation route 715. The user 703 may correspond to the user 203. The plurality of way points 711a and 711b may be indicative of a plurality of locations on the electronic chart 105a, where each way point includes a direction for defining the navigation route 715. According to an embodiment, the navigation display device 101 may allow the user 703 to select the plurality of way points 711a and 711b, when the mode setting unit 107b sets the route setting mode. For example, the mode setting unit 107b sets the route setting unit, if the user 703 selects the route setting mode.

As illustrated in FIG. 7, the user 703 may select the plurality of way points 711a and 711b by touching the input interface 103b with the route setting mode selected. Alternatively, the user 703 may select the plurality of way points 711a and 711b by using the mouse and/or the keyboard. Once the plurality of way points are selected, the input interface 103b may be configured to receive the position information indicating a position of each of the plurality of way points 711a and 711b. The route setting unit 107a may obtain the position information of the plurality of way points 711a and 711b, when the mode setting unit 107b sets to the route setting mode. The route setting unit 107a may be further configured to set the navigation route 715 using the plurality of route lines 713a and 713b and the plurality of way points 711a and 711b. For example, the navigation route 715 determined using the plurality of route lines 713a and 713b and the plurality of way points 711a and 711b may be used for the nautical navigation.

According an embodiment, the navigation display device 101 may allow the user 703 to select the plurality of way points 711a and 711b in accordance with the movable measurement point 707 and the plurality of base points 705a and 705b. In other words, the navigation display device 101 may allow the user 703 to select the plurality of way points 711a and 711b while displaying with the movable measurement point 707 and the plurality of base points 705a and 705b. In this example embodiment, the input interface 103b may be configured to receive the position information of the plurality of way points, while the display part 103a displaying the plurality of base points 705a and 705b and the moveable measurement point 707 on the electronic chart 105a.

According to an embodiment, the navigation display device 101 may be further configured to replace the position information of the way point (e.g. at least one of the way point 711a or the way point 711b) with the position information of the movable measurement point 707, when the position information of the way point is within a predetermined range from the movable measurement point 707. For example, after selecting the base points 705a and 705b with input mode selected, the navigation display device 101 may be configured to display the base points 705a and 705b, the movable measurement point 707, and the calculated distances, as explained in the detailed description of FIG. 2B. Further, for instance, if the user 703 knows that a travel of the vessel after 0.5 NM from a shore defined by the base point 705a is not safe (due to weather conditions, obstacles, or the like), the user 703 may select the movable measurement point edit mode and may move the movable measurement point 707 to place the movable measurement point 707 at a distance of 0.5 NM from the base point 705a. To this end, the navigation display device 101 may be configured to change the position of the movable measurement point 707 and display the base points 705a and 705b, the movable measurement point 707, and the recalculated distances as explained in the detailed description of FIG. 2C.

Furthermore, the user 203 may select, using the movable measurement point 707, the plurality of way points 711a and 711b for defining the navigation route 715 that is safe for the travel of the vessel. For example, for defining the navigation route 715, the user 703 may select the way point 711a at the position of the movable measurement point 707 and may select the way point 711b. In this case, the navigation display device 101 may replace the position information of the way point 711a with the position information of the movable measurement point 707, if the position information of the way point 711a is within the predetermined range from the position information of the movable measurement point 707.

Additionally, in some embodiments, the navigation display device 101 may be further configured to replace the position information of the way point (e.g. at least one of the way point 711a and the way point 711b) with the position information of the base point (e.g. at least one of the base points 705a and 705b), when the position information of the way point is within the predetermined range from the base point.

In this way, the navigation display device 101 may allow the user 703 to select the plurality of way points 711a and 711b in accordance with the movable measurement point 707 and/or the plurality of base points 705a and 705b. Accordingly, the navigation display device 101 provides the hassle free user interface by setting the movable measurement point between a line connecting the base points 705a and 705b, which may be used for planning the navigation route 715 that is safe for the vessel.

Figure 8:
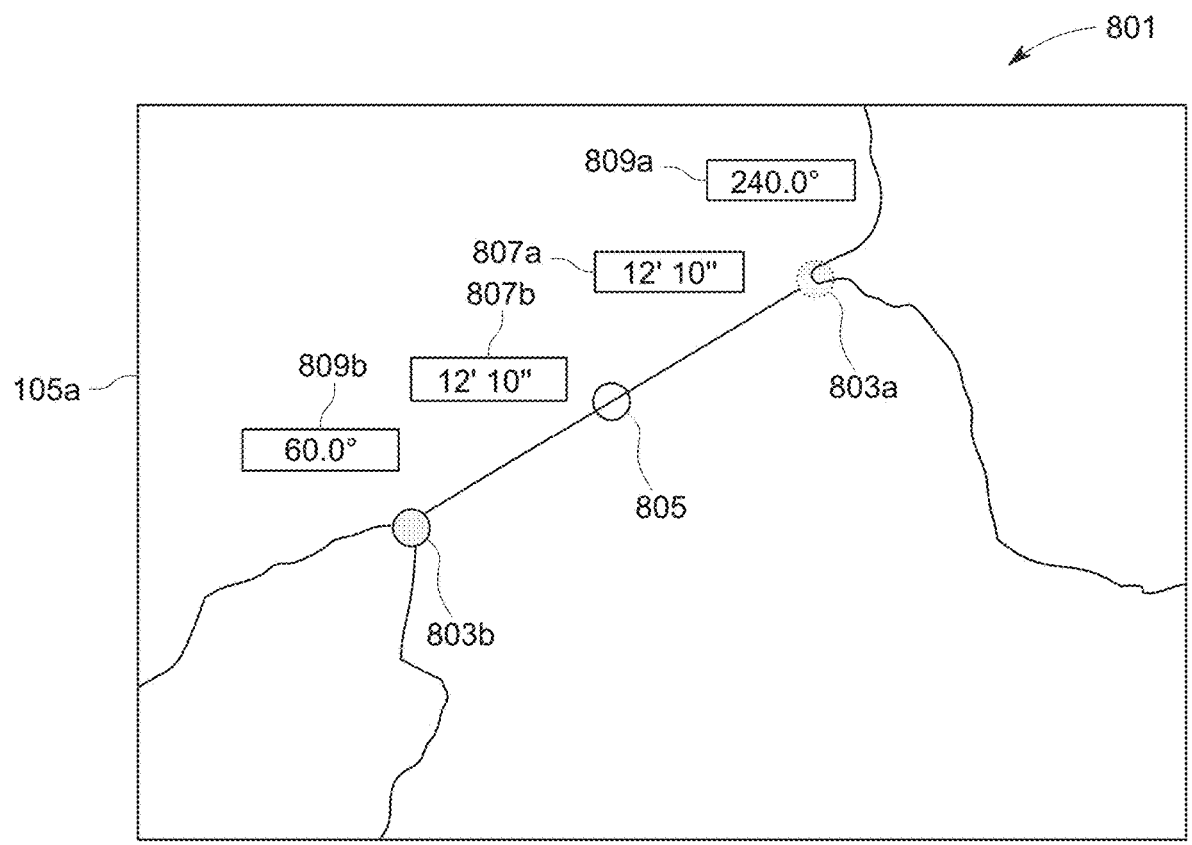
FIG. 8 illustrates a schematic view for displaying navigation times and directions, in accordance with an example embodiment of the present disclosure.

FIG. 8 illustrates a schematic view 801 for displaying navigation times 807a and 807b and directions 809a and 809b, in accordance with an example embodiment of the present disclosure. FIG. 8 is explained in conjunction with FIG. 1A and FIG. 1B. The schematic view 801 may illustrate the electronic chart 105a displayed on the touch panel display 103. The schematic view 801 may include a plurality of base points 803a and 803b, a movable measurement point 805, the navigation time 807a, the navigation time 807b, the direction 809a and the direction 809b. The plurality of base points 803a and 803b may correspond to the plurality of base points 205a and 205b respectively. The movable measurement point 805 may correspond to the movable measurement point 211 set by the measurement point setting unit 109b.

According to an embodiment, once the movable measurement point 805 is set by the measurement point setting unit 109b, the calculation unit 109c may be configured to calculate the distance between the base point 803a and the movable measurement point 805 and the distance between the movable measurement point 805 and the base point 803b. In addition to calculating the distances, the calculation unit 109c may be further configured to calculate the navigation time 807a from the base point 803a to the movable measurement point 805 and the navigation time 807b from the movable measurement point 805 to the base point 803b. For calculating the navigation time 807a, the calculation unit 109c may divide the distance between the movable measurement point 805 and the base point 803a by the speed of vessel (or by the average speed of the vessel). For example, the navigation time 807a may be numerically equal to 12 minutes 10 seconds. The average speed of the vessel may be determined by taking an average of the speed of the vessel for a predefined time period. For calculating the navigation time 807b, the calculation unit 109c may divide the distance between the movable measurement point 805 and the base point 803b by the speed of vessel (or by the average speed of the vessel). For example, the navigation time 807b may be numerically equal to 12 minutes 10 seconds. Additionally, the calculation unit 109c may calculate navigation time from the base point 803a to the base point 803b.

Furthermore, the calculation unit 109c may be configured to calculate the direction 809a of the base point 803b as seen from the base point 803a; and calculate the direction 809b of the base point 803a as seen from the base point 803b. For example, the direction 809a and the direction 809b may be calculated based on the position information of the base points 803a and 803b. For example, the direction 809a and 809b may be numerically equal to 240 degree and 60 degree respectively. If the direction is numerically equal to 0 degrees, then the direction may indicate a north direction. Similarly, the directions of 90 degree, 180 degree, and 270 degree may indicate an east direction, a south direction, and a west direction respectively.

The output unit 109d may be configured to output, to the display part 103a, the calculated distances, the calculated navigation times 807a and 807b, and the calculated directions 809a and 809b. The display part 103a may display, on the electronic chart 105a, the calculated navigation times 807a and 807b and the calculated directions 809a and 809b, as illustrated in FIG. 8. Additionally, the display part 103a may display the calculated distances (as shown in FIG. 2B).

Figure 9:
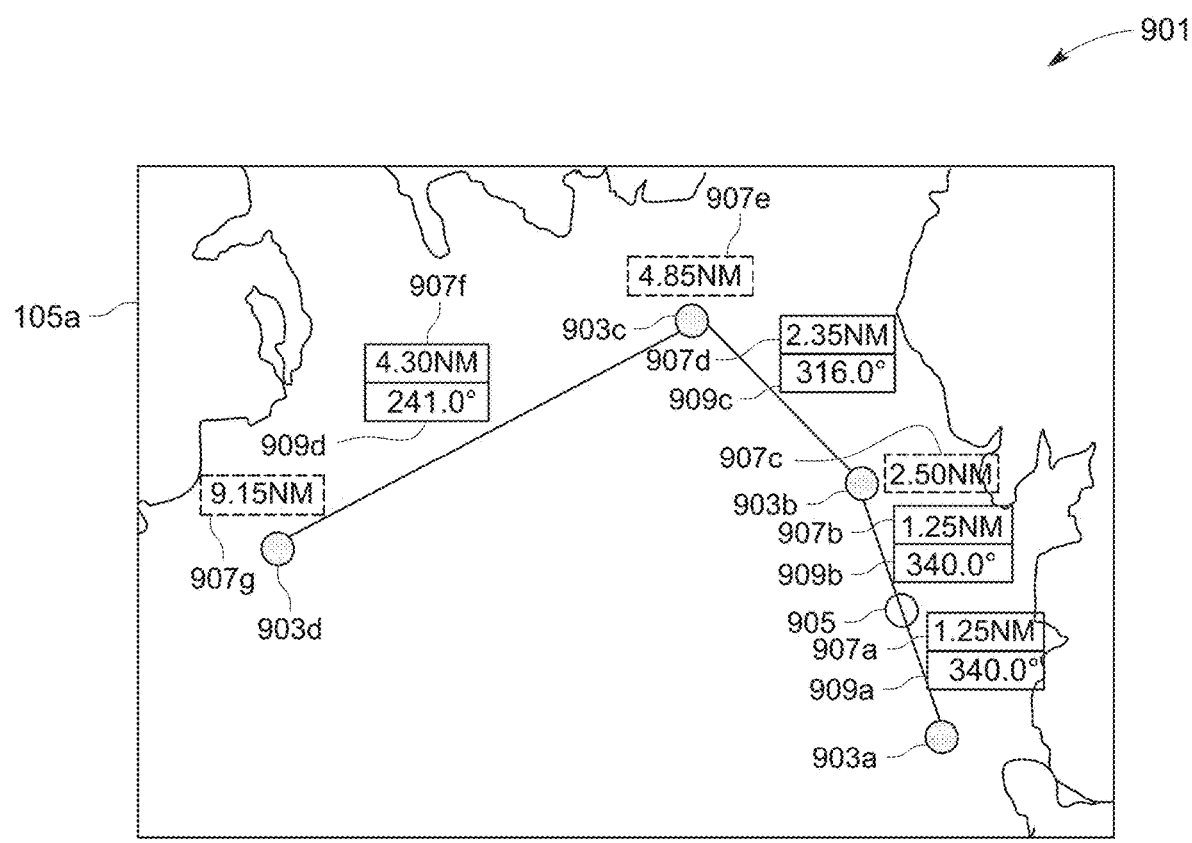
FIG. 9 illustrates a schematic view for displaying distances and directions, in accordance with another example embodiment of the present disclosure.

FIG. 9 illustrates a schematic view 901 for displaying distances 907a, 907b, 907c, 907d, 907e, 907f, and 907g and directions 909a, 909b, 909c, and 909d, in accordance with another example embodiment of the present disclosure. FIG. 9 is explained in conjunction with FIG. 1A and FIG. 1B. The schematic view 901 may illustrate the electronic chart 105a displayed on the touch panel display 103. The schematic view 901 may include a plurality of base points 903a, 903b, 903c, and 903d, a movable measurement point 905, the distance 907a, the distance 907b, the distance 907c, the distance 907d, the distance 907e, the distance 907f, the distance 907g, the direction 909a, the direction 909b, the direction 909c, and the direction 909d. The plurality of base points 903a, 903b, 903c, and 903d may correspond to the plurality of base points 305a, 305b, 305c, and 305d respectively. The movable measurement point 905 may correspond to the movable measurement point 311 set by the measurement point setting unit 109b.

Once the movable measurement point 905 is set, the calculation unit 109c may be configured to calculate, on the electronic chart 105a, the distance 907a between the movable measurement point 905 and the base point 903a; the distance 907b between the movable measurement point 905 and the base point 903b; the distance 907c between the adjacent base points 903a and 903b; the distance 907d between the adjacent base points 903b and 903c, the distance 907e from the base point 903a to the base point 903c; the distance 907f between the adjacent base points 903c and 903d; and the distance 907g from the base point 903a to the base point 903d. Further, the calculation unit 109c may be configured to calculate the direction 909a of the base point 903b as seen from the base point 903a; the direction 909b of the base point 903b as seen from the base point 903a; the direction 909c of the base point 903c as seen from the base point 903a; and the direction 909d of the base point 903d as seen from the base point 903a. Furthermore, the calculation unit 109c may be configured to calculate the navigation time between the adjacent base points of the plurality of base points 903a, 903b, 903c, and 903d and/or the navigation time between the movable measurement point and at least one base point of the adjacent base points of the plurality of base points 903a, 903b, 903c, and 903d.

The output unit 109d may be configured to output, to the display part 103a, the distances 907a, 907b, 907c, 907d, 907e, 907f, and 907g and the directions 909a, 909b, 909c, and 909d, based on requirements of the user. The display part 103a may display, on the electronic chart 105a, the distances 907a, 907b, 907c, 907d, 907e, 907f, and 907g and the directions 909a, 909b, 909c, and 909d, as illustrated in FIG. 9.

Figure 10:
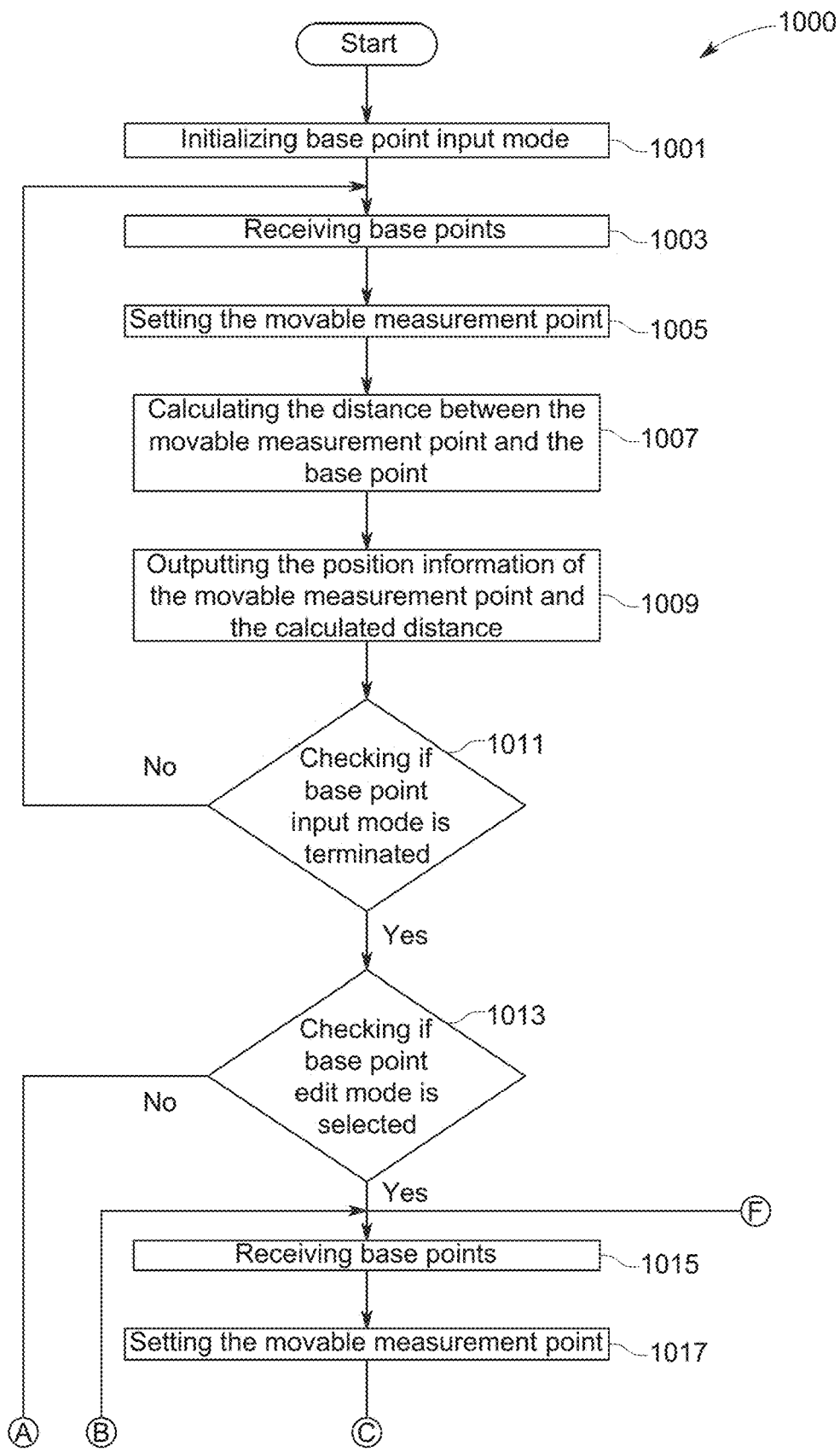
FIG. 10 illustrates a measurement method associated with a measurement mode, in accordance with an example embodiment of the present disclosure.
Figure 10:
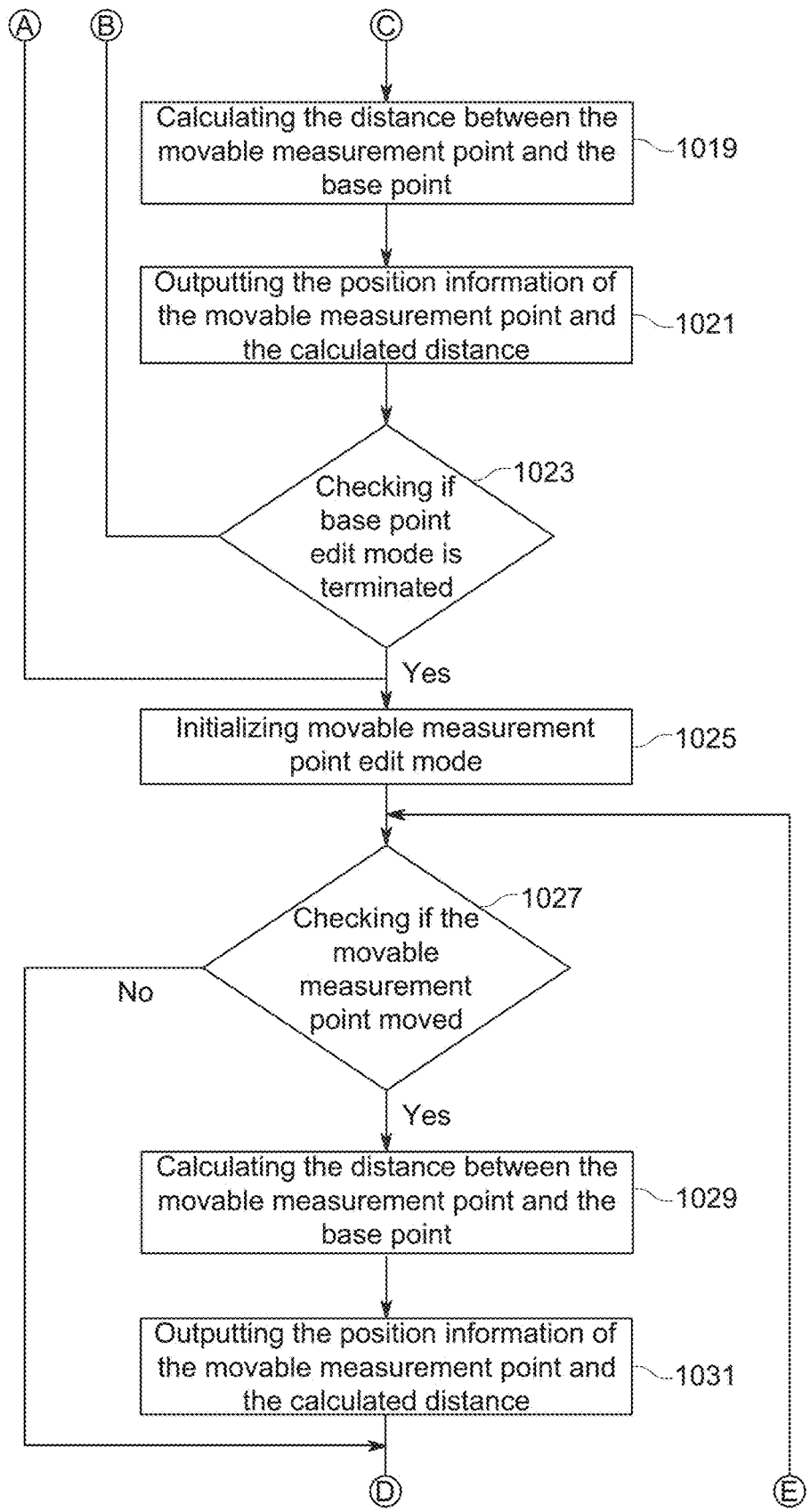
Figure 10:
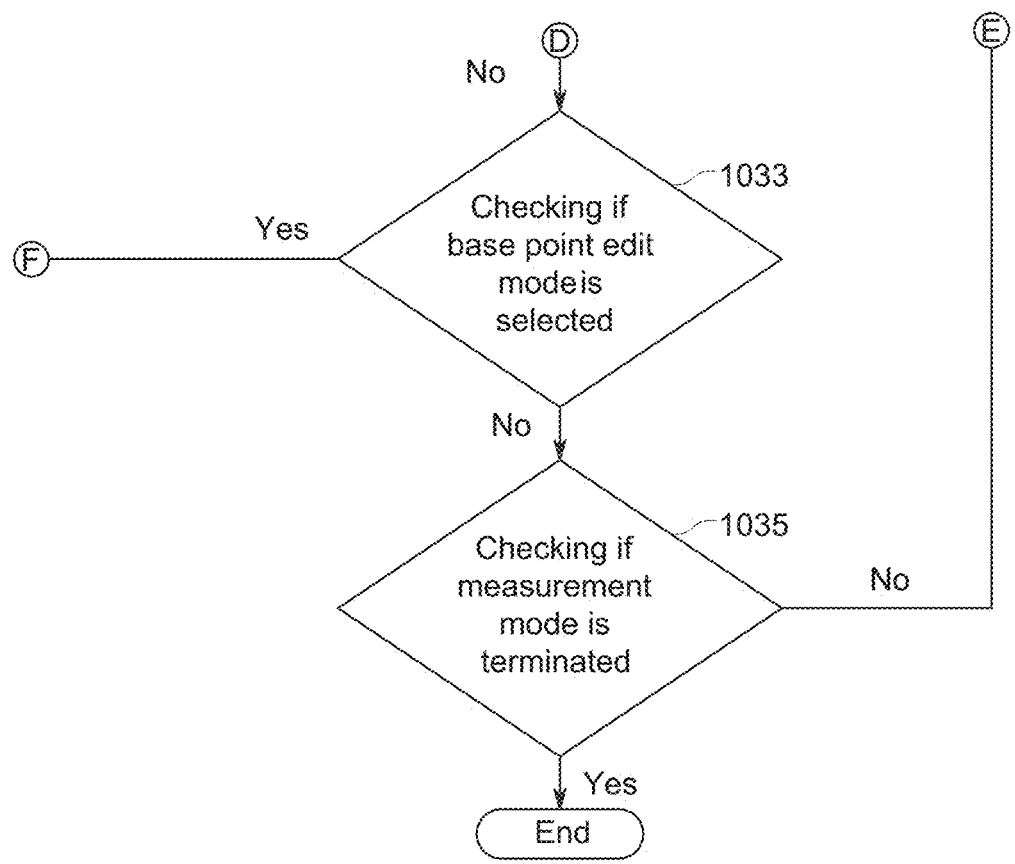

FIG. 10 illustrates a measurement method 1000 associated with the measurement mode, in accordance with an example embodiment of the present disclosure. The measurement method 1000 may be used in conjunction with the navigation display device 101 described in the detailed description of FIG. 1A—FIG. 9. Starting at step 1001, the measurement method 1000 may include initializing the base point input mode (the input mode). For example, the mode setting unit 107b may set the base point input mode. At step 1003, the measurement method 1000 may include receiving a plurality of base points. For example, the input interface 103b may receive the position information of the plurality of base points 205a and 205b on the electronic chart 105a. At step 1005, the measurement method 1000 may include setting the movable measurement point. For instance, the nautical chart processing device 109 may set the movable measurement point 211 on the straight line 209 connecting the base points 205a and 205b At step 1007, the measurement method 1000 may include calculating the distance between the movable measurement point and the at least one base point of the plurality of base points. For instance, the nautical chart processing device 109 may calculate the distance 213a between the movable measurement point 211 and the base point 205a or may calculate the distance 213b between the movable measurement point 211 and the base point 205b.

At step 1009, the measurement method 1000 may include outputting the position information of the movable measurement point and the calculated distance. For instance, the nautical chart processing device 109 may output, for displaying the movable measurement point 211 and the calculated distance 213a or 213b, the position information of the movable measurement point 211 and the calculated distance 213a or 213b. Additionally, the nautical chart processing device 109 may calculate and output the distance between the plurality of base points 205a and 205b. Additionally, the nautical chart processing device 109 may calculate and output the navigation times, which may include the navigation time between the plurality of base points 205a and 205b and/or the navigation time between the movable measurement point and the at least one base point of the plurality of base points 205a and 205b. Additionally, the nautical chart processing device 109 may calculate and output the directions, which may include the direction of the base point 205b as seen from the base point 205a and the direction of the base point 205a as seen from the base point 205b.

At step 1011, the measurement method 1000 may include checking if the base point input mode is terminated. For example, the mode setting unit 107b may terminate the base point input mode. If the base point input mode is not terminated, the measurement method 1000 may proceed with step 1003. If the base point input mode is terminated, the measurement method 1000 may proceed with step 1013.

At step 1013, the measurement method 1000 may include checking if the base point edit mode is selected. For example, the mode setting unit 107b may set the base point edit mode, if the user selects the base point edit mode. If the base point edit mode is selected, the measurement method 1000 may proceed with step 1015. At step 1015, the measurement method 1000 may include receiving the plurality of base points. For instance, the input interface 103b may receive the new position information of the at least one base point of the plurality of base points 505a and 505b, where the base points 505a and 505b may correspond to the base points 205a and 205b respectively.

At step 1017, the measurement method 1000 may include setting the movable measurement point. For instance, the nautical chart processing device 109 may set the movable measurement point (e.g. the movable measurement point 513) on a new straight line connecting a changed base point (e.g. the base point 511) and an unchanged base point (505b) at a position corresponding to the arrangement information. At step 1019, the measurement method 1000 may include calculating the distance between the movable measurement point and the base point. For instance, the nautical chart processing device 109 may recalculate the distance between the movable measurement point 513 and the base point 511, in response to receiving the new position information of the at least one base point of the plurality of base points 505a and 505b. At step 1021, the measurement method 1000 may include outputting the position information of the movable measurement point and the calculated distance. For instance, the nautical chart processing device 109 may output, for displaying the movable measurement point 513 and the calculated distance, the position information of the movable measurement point 513 and the calculated distance.

At step 1023, the measurement method 1000 may include checking if the base point edit mode is terminated. For example, the mode setting unit 107b may terminate the base point edit mode. If the base point edit mode is not terminated, the measurement method 1000 may proceed with step 1015. If the base point edit mode is terminated, the measurement method 1000 may proceed with step 1025. Alternatively, the measurement method 1000 may proceed with step 1025, even if the base point edit mode is not selected.

At step 1025, the measurement method 1000 may include initializing the movable measurement point edit mode. For instance, the mode setting unit 107b may set the movable measurement point edit mode. At step 1027, the measurement method 1000 may include checking if the movable measurement point moved. If the movable measurement point moved, the measurement method 1000 may proceed with step 1029. At step 1029, the measurement method 1000 may include calculating the distance between the movable measurement point and the base point. For instance, the nautical chart processing device 109 may recalculate the distance, in response to receiving the new position information of the movable measurement point. At step 1031, the measurement method 1000 may include outputting the position information of the movable measurement point and the calculated distance. For instance, the nautical chart processing device 109 may output the position information of the movable measurement point and the calculated distance. If the movable measurement point has not moved (at step 1027), the measurement method 1000 may proceed with step 1033.

At step 1033, the measurement method 1000 may include checking if the base point edit mode is selected. If the base point edit mode is selected, the measurement method 1000 may proceed with step 1015. If the base point edit mode is not selected, the measurement method 1000 may proceed with step 1035. At step 1035, the measurement method 1000 may include checking if the measurement mode is terminated. For example, the mode setting unit 107*b* may terminate the measurement mode. If the measurement mode is not terminated, the measurement method 1000 may proceed with step 1027. If the measurement mode is terminated, the measurement method 1000 may include ending the process or may include initializing route setting mode to set the navigation route.

On implementing the measurement method 1000, the navigation display device 101 may be configured to switch between multiple modes (e.g. the base point input mode, the base point edit mode, and the movable measurement point edit mode) associated with the measurement mode and further may be configured to switch from the measurement mode to route setting mode. Furthermore, the navigation display device 101 may be configured to display the base points, the movable measurement point, and the distances, which may be used to planning the navigation route that is safe for the vessel travel.

Figure 11:
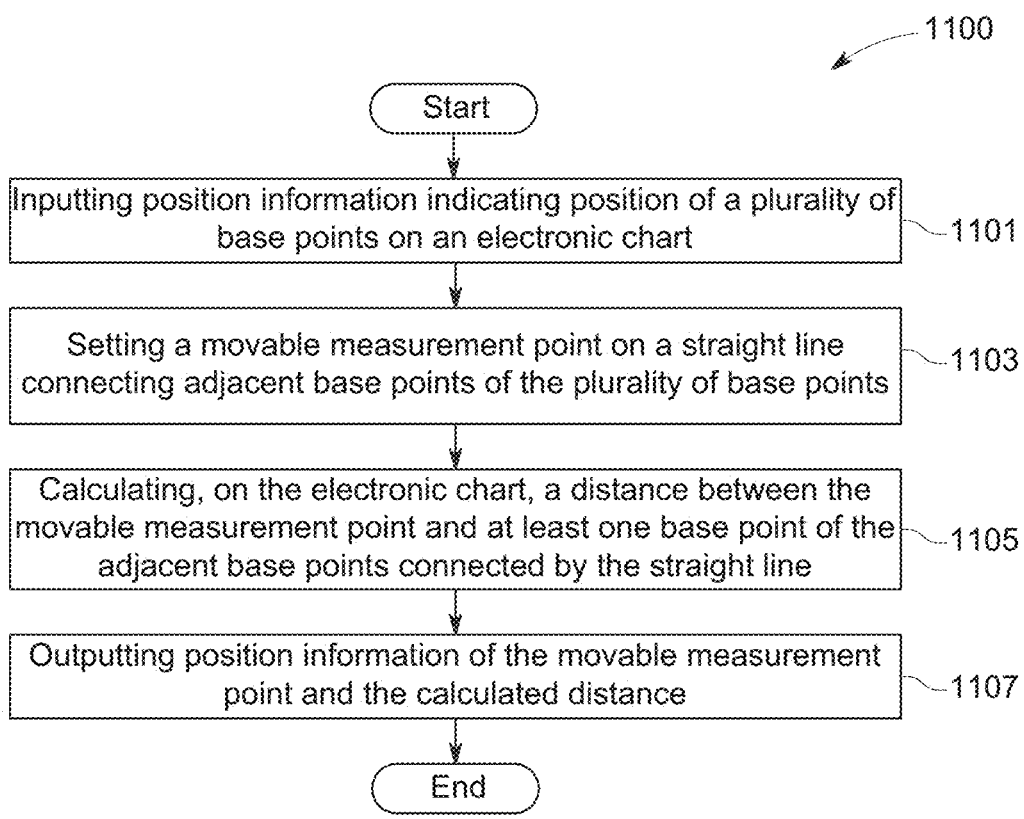
FIG. 11 illustrates a nautical chart processing method for outputting the position information of the movable measurement point and the calculate distance, in accordance with an example embodiment of the present disclosure.

FIG. 11 illustrates a nautical chart processing method 1100 for outputting the position information of the movable measurement point and the calculate distance, in accordance with an example embodiment of the present disclosure. The nautical chart processing method 1100 may be used in conjunction with the nautical chart processing device 109 described in the detailed description of FIG. 1B. Starting at step 1101, the nautical chart processing method 1100 may include inputting the position information indicating the position of the plurality of base points on the electronic chart 105*a*. For instance, the reception unit 109*a* may input the position information indicating the position of each of the plurality of base points 205*a* and 205*b* on the electronic chart 105*a*, as explained in the detailed description of FIG. 2A.

At step 1103, the nautical chart processing method 1100 may include setting the movable measurement point on the straight line connecting the adjacent base points of the plurality of base points. For instance, the measurement point setting unit 109*b* may set the movable measurement point 211 on the line 209 (the straight line 209) connecting the adjacent base points (or the pair of base points) 205*a* and 205*b*. Further, the movable measurement point 211 may be at least one the static movable measurement point or a movable measurement point that is changeable in real time.

At step 1105, the nautical chart processing method 1100 may include calculating the distance on the electronic chart between the movable measurement point and at least one base point of the adjacent base points connected by the straight line. For instance, the calculation unit 109*c* may calculate, on the electronic chat 105*a*, the distances 213*a*, 213*b*, and 213*c*, as explained in the detailed description of FIG. 2B.

At step 1107, the nautical chart processing method 1100 may include outputting the position information of the movable measurement point and the calculated distance. For instance, the output unit 109*d* may output, to the display part 103*a*, the position information of the movable measurement point 211 and the calculated distances 213*a*, 213*b*, and 213*c*. The display part 103*a* may display the position information of the movable measurement point 211 and the calculated distances 213*a*, 213*b*, and 213*c*.

On implementing the nautical chart processing method 1100, the nautical chart processing device may output the position information of the movable measurement point and calculated distance. Based on the position information of the movable measurement point and calculated distance, the navigation display device may display the movable measurement point and the calculated distance, which may be used for planning the navigation route that is safe for the vessel.

Many modifications and other embodiments of the disclosures set forth herein will come to mind of one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiment disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, movable, fixed, adjustable, and/or releasable connections or attachments. The connections/attachments can include direct connections and/or connections having intermediate structure between the two components discussed.

Unless otherwise explicitly stated, numbers preceded by a term such as "approximately", "about", and "substantially" as used herein include the recited numbers, and also represent an amount close to the stated amount that still performs a desired function or achieves a desired result. For example, unless otherwise explicitly stated, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A nautical chart processing device, comprising:
processing circuitry configured to:
display an electronic chart on a display,
receive a first and second input to the electronic chart displayed on the display,
based on the first and second inputs to the electronic chart displayed on the display:
receive position information indicating a position of each of a pair of base points on the electronic chart, the position of each of the pair of base points respectively corresponding to the first and second input, and
display, on the electronic chart, the pair of base points and a first straight line connecting the pair of base points,
receive a third input to the electronic chart displayed on the display,
based on the third input to the electronic chart displayed on the display:

set and display a first movable measurement point on the first straight line that is displayed on the electronic chart, wherein the first movable measurement point is movable on the first straight line in real time, determine and display a first and second changeable distance on the electronic chart between the first movable measurement point and a corresponding first and second base point of the pair of base points, along with a first static distance between the first and second base points, receive a fourth input to the electronic chart displayed on the display, the fourth input being a slide of the third input along the first straight line connecting the first and second base points, and while sliding the third input, determine and display, in real time, updates to the first and second changeable distances on the electronic chart, along with the first static distance between the first and second base points.

2. The nautical chart processing device of claim 1, wherein the processing circuitry is further configured to:

receive additional inputs to the electronic chart displayed on the display, and based on the additional inputs to the electronic chart displayed on the display, determine and display position information indicating a position of each of a plurality of additional base points on the electronic chart, the position of the additional base points respectively corresponding to the additional inputs to the electronic chart displayed on the display.

3. The nautical chart processing device of claim 2, wherein the first, second, third, fourth and additional inputs to the electronic chart displayed on the display are first, second, third, fourth and additional touch inputs to the electronic chart displayed on the display.

4. The nautical chart processing device of claim 1, wherein the processing circuitry is further configured to:

receive a fifth input to the electronic chart displayed on the display, based on the fifth input to the electronic chart displayed on the display, determine a changed position of the first base point of the pair of base points, remove the first base point, the first movable measurement point and the first straight line from the electronic chart. and display, on the electronic chart, the updated first base point and the second base point, and a second straight line connecting the updated first base point and the second base point, receive a sixth input to the electronic chart displayed on the display, and based on the sixth input to the electronic chart displayed on the display, set and display a second movable measurement point on the second straight line that is displayed on the electronic chart, wherein the second movable measurement point is movable on the second straight line in real time, determine and display updated first and second changeable distances on the electronic chart between the second movable measurement point and a corresponding one of the updated first base point and second base point, along with a second static distance between the updated first base point and second base point.

5. The nautical chart processing device of claim 4, wherein the first, second, third, fourth, fifth and sixth inputs to the electronic chart displayed on the display are first, second, third, fourth, fifth and sixth touch inputs to the electronic chart displayed on the display.

6. The nautical chart processing device of claim 1, wherein the processing circuitry is further configured to:

store arrangement information associated with the first movable measurement point, and wherein the first movable measurement point is set on the first straight line connecting the pair of base points at a position corresponding to the arrangement information.

7. The nautical chart processing device of claim 6, wherein the arrangement information comprises an internal division ratio value corresponding to an internal division of a line segment formed by the first straight line between the pair of base points.

8. The nautical chart processing device of claim 7, wherein, based on the position information of the first base point of the pair of base points changing, the processing circuitry is further configured to set the position of the first movable measurement point according to the internal division ratio value before changing position information of the first base point.

9. The nautical chart processing device of claim 6, wherein the arrangement information includes a first and second setting distance from respective ones of the first and second base points to the first movable measurement point.

10. The nautical chart processing device of claim 9, wherein, based on the position information of the first base point of the pair of base points changing, the processing circuitry is further configured to set the position of the first movable measurement point based on the setting distance from one of the pair of base points to the first movable measurement point before changing the position information of the first base point.

11. The nautical chart processing device of claim 1, wherein the processing circuitry is further configured to:

retrieve from a memory information about a pre-existing static object within a predetermined distance from the first base point of the pair of base points, display the pre-existing static object the electronic chart, receive a fifth input to the electronic chart displayed on the display, the fifth input being a slide from the first base point to the displayed pre-existing static object, and based on the fifth input to the electronic chart displayed on the display, remove the first base point, the first movable measurement point and the first straight line from the electronic chart, and display, on the electronic chart, a second straight line connecting the displayed pre-existing static object and the second base point, receive a sixth input to the electronic chart displayed on the display, and based on the sixth input to the electronic chart displayed on the display, set and display a second movable measurement point on the second straight line that is displayed on the electronic chart, wherein the second movable measurement point is movable on the second straight line in real time, determine and display updated first and second changeable distances on the electronic chart between the second movable measurement point and a corresponding one of the displayed pre-existing static object and second base point, along with a second static distance between the displayed pre-existing static object and second base point.

12. The nautical chart processing device of claim 11, wherein the first, second, third, fourth and fifth inputs to the electronic chart displayed on the display are first, second, third, fourth and fifth touch inputs to the electronic chart displayed on the display.

13. The nautical chart processing device of claim 1, wherein the processing circuitry is further configured to:
receive additional inputs to the electronic chart displayed on the display,
based on the additional inputs to the electronic chart displayed on the display, determining position information indicating one or more positions respectively corresponding to one or more way points for a navigation route, and
display the one or more positions respectively corresponding to one or more way points for the navigation route on the electronic chart,
wherein one of the one or more positions respectively corresponding to one or more way points for the navigation route is one of the position of the first movable measurement point or the position of the first base point.

14. The nautical chart processing device of claim 13, wherein the first, second, third, fourth and additional inputs to the electronic chart displayed on the display are first, second, third, fourth and additional touch inputs to the electronic chart displayed on the display.

15. The nautical chart processing device of claim 1, wherein the first, second, third and fourth inputs to the electronic chart displayed on the display are first, second, third and fourth touch inputs to the electronic chart displayed on the display.

16. A navigation display device comprising:
the nautical chart processing device according to claim 1;
the display;
input interface configured to receive the first, second, third and fourth inputs;
the processing circuitry configured to:
store the electronic chart; and
set a navigation route for a moving object.

17. The navigation display device of claim 16, wherein the input interface is configured to receive position information of a plurality of waypoints for the navigation route while displaying the pair of base points and the first movable measurement point on the electronic chart.

18. The navigation display device of claim 17, wherein the position information of at least one waypoint of the plurality of waypoints is replaced with one or more of the position information of the first movable measurement point or the position information of the at least one base point of the pair of base points,
wherein the at least one base point of the pair of base points is within a predetermined distance range from the at least one waypoint of the plurality of waypoints.

19. The navigation display device of claim 16, wherein the processing circuitry is further configured to calculate at least one of a navigation time or a direction from one base point to another base point in the pair of base points.

20. A nautical chart processing method performed by processing circuitry of a nautical chart processing device that includes a display, the nautical chart processing method comprising:
displaying an electronic chart on the display;
receiving a first and second input to the electronic chart displayed on the display;
based on the first and second input to the electronic chart displayed on the display:
determining position information indicating a position of each of a pair of base points on the electronic chart, the position of each of the pair of base points respectively corresponding to the first and second input; and
displaying, on the electronic chart, the pair of base points and a first straight line connecting the pair of base points;
receiving a third input to the electronic chart displayed on the display;
based on the third input to the electronic chart displayed on the display, setting a first movable measurement point on the first straight line,
wherein the first movable measurement point is movable on the first straight line in real time;
determining and displaying a first and second changeable distance on the electronic chart between the first movable measurement point and a corresponding first and second base point of the pair of base points, along with a first static distance between the first and second base points,
receiving a fourth input to the electronic chart displayed on the display, the fourth input being a slide of the third input along the first straight line connecting the first and second base points, and
while sliding the third input, determining and displaying, in real time, updates to the first and second changeable distances on the electronic chart, along with the first static distance between the first and second base points.

21. The nautical chart processing method of claim 20, wherein the first, second, third and fourth inputs to the electronic chart displayed on the display are first, second, third and fourth touch inputs to the electronic chart displayed on the display.

22. A non-transitory computer readable medium storing instructions that, when executed by one or more processors, cause a computing device that has a display to perform a method that comprises:
displaying an electronic chart on the display;
receiving a first and second input to the electronic chart displayed on the display;
based on the first and second input to the electronic chart displayed on the display:
determining position information indicating a position of each of a pair of base points on the electronic chart, the position of each of the pair of base points respectively corresponding to the first and second input; and
displaying, on the electronic chart, the pair of base points and a first straight line connecting the pair of base points;
receiving a third input to the electronic chart displayed on the display;
based on the third input to the electronic chart displayed on the display:
setting and displaying a first movable measurement point on the first straight line that is displayed on the electronic chart,
wherein the first movable measurement point is movable on the first straight line in real time;
determining and displaying a first and second changeable distance on the electronic chart between the first movable measurement point and a corresponding first and second base point of the pair of base points, along with a first static distance between the first and second base points, receiving a fourth input to the electronic chart displayed on the display, the fourth input being a slide of the third input along the first straight line connecting the first and second base points, and while sliding the third input, determining and displaying, in real time, updates to the first and second changeable distances on the electronic chart, along with the first static distance between the first and second base points.

23. The non-transitory computer readable medium of claim 22, wherein the first, second, third and fourth inputs to the electronic chart displayed on the display are first, second, third and fourth touch inputs to the electronic chart displayed on the display.

* * * * *